US011396034B2

(12) United States Patent
Rose et al.

(10) Patent No.: US 11,396,034 B2
(45) Date of Patent: Jul. 26, 2022

(54) MOTOR CONTROL OF A DRAIN CLEANING MACHINE

(71) Applicant: MILWAUKEE ELECTRIC TOOL CORPORATION, Brookfield, WI (US)

(72) Inventors: David Rose, Pewaukee, WI (US); Christopher J. Turner, Lannon, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

(21) Appl. No.: 17/053,004

(22) PCT Filed: Sep. 21, 2020

(86) PCT No.: PCT/US2020/051813
§ 371 (c)(1),
(2) Date: Nov. 4, 2020

(87) PCT Pub. No.: WO2021/067059
PCT Pub. Date: Apr. 8, 2021

(65) Prior Publication Data
US 2021/0229140 A1 Jul. 29, 2021

Related U.S. Application Data
(60) Provisional application No. 62/907,828, filed on Sep. 30, 2019.

(51) Int. Cl.
*H02P 6/28* (2016.01)
*H02P 6/24* (2006.01)
(Continued)

(52) U.S. Cl.
CPC ............. *B08B 9/047* (2013.01); *H02K 7/14* (2013.01); *H02K 29/08* (2013.01); *H02P 6/17* (2016.02); *H02P 6/28* (2016.02)

(58) Field of Classification Search
CPC .... H02P 6/28; H02P 6/24; H02K 7/14; H02K 29/06; H02K 29/14; B08B 9/02; B08B 2209/02
See application file for complete search history.

(56) References Cited

U.S. PATENT DOCUMENTS 2,266,659 A   12/1941  Robinson et al.
2,705,642 A    4/1955  Chasar
(Continued)

FOREIGN PATENT DOCUMENTS

CN      2179795 Y    10/1994
CN    201052511 Y     4/2008
(Continued)

OTHER PUBLICATIONS

International Search Report and Written Opinion for Application No. PCT/US2020/051813 dated Dec. 30, 2020 (9 pages).
(Continued)

*Primary Examiner* — Thai T Dinh
(74) *Attorney, Agent, or Firm* — Michael Best & Friedrich LLP

(57) ABSTRACT

A drain cleaning machine includes a brushless direct current (DC) motor configured to rotate a snake about the snake axis. An electronic processor is configured to control power switching elements to drive the brushless DC motor. In a first operating range when a load experienced by the brushless DC motor is less than or equal to a predetermined load, the electronic processor is configured to control the power switching elements to drive the brushless DC motor at an approximately constant speed regardless of the load experienced by the brushless DC motor. In a second operating range when the load experienced by the brushless DC motor is greater than the predetermined load, the electronic processor is configured to control the power switching elements
(Continued)

to drive the brushless DC motor at a decreasing speed as the load experienced by the brushless DC motor increases.

20 Claims, 25 Drawing Sheets

(51) Int. Cl.
*H02K 7/14* (2006.01)
*H02K 29/06* (2006.01)
*H02K 29/14* (2006.01)
*B08B 9/02* (2006.01)
*B08B 9/047* (2006.01)
*H02P 6/17* (2016.01)
*H02K 29/08* (2006.01)

(56) References Cited

U.S. PATENT DOCUMENTS

| | | | |
|---|---|---|---|
| 2,955,307 A | 10/1960 | Hunt | |
| 3,075,218 A | 1/1963 | Kollmann | |
| 3,213,473 A | 10/1965 | Singer | |
| 4,361,924 A | 12/1982 | Irwin | |
| 4,447,926 A | 5/1984 | Rothenberger | |
| 4,556,352 A | 12/1985 | Resnicow | |
| 5,414,888 A | 5/1995 | Irwin | |
| 5,603,136 A | 2/1997 | Truschler | |
| 5,649,613 A | 7/1997 | Truschler | |
| 5,657,505 A | 8/1997 | Gallagher et al. | |
| 6,076,219 A | 6/2000 | Irwin | |
| 6,546,582 B2 | 4/2003 | Silverman | |
| 8,169,170 B2 * | 5/2012 | Yasohara | H02P 23/06 318/383 |
| 8,413,347 B2 * | 4/2013 | Gress | B08B 9/045 33/733 |
| 8,696,286 B1 | 4/2014 | Martin | |
| 9,021,673 B2 | 5/2015 | Ray | |
| 10,166,665 B2 | 1/2019 | Szymusiak et al. | |
| 10,272,480 B2 | 4/2019 | Zink et al. | |
| 10,889,976 B2 | 1/2021 | Skrjanc et al. | |
| 2009/0211044 A1 * | 8/2009 | Hale | B08B 9/045 15/104.33 |
| 2013/0319190 A1 | 12/2013 | Nino et al. | |
| 2014/0106889 A1 | 4/2014 | Cheng | |
| 2015/0150635 A1 | 6/2015 | Kilroy et al. | |
| 2015/0321326 A1 | 11/2015 | Nino et al. | |
| 2016/0245441 A1 | 8/2016 | Klein et al. | |
| 2018/0030714 A1 | 2/2018 | Miller et al. | |
| 2018/0030715 A1 | 2/2018 | Miller et al. | |
| 2018/0147713 A1 * | 5/2018 | Schmauder | E03C 1/302 |
| 2019/0162558 A1 * | 5/2019 | Schmauder | B08B 9/047 |
| 2019/0186551 A1 | 6/2019 | Skrjanc et al. | |
| 2019/0210077 A1 | 7/2019 | Zink et al. | |
| 2020/0048885 A1 | 2/2020 | Reed et al. | |
| 2020/0230789 A1 * | 7/2020 | Dey, IV | B25B 23/1475 |
| 2021/0245208 A1 | 8/2021 | Reed et al. | |

FOREIGN PATENT DOCUMENTS

| | | | |
|---|---|---|---|
| CN | 203222865 U | 10/2013 | |
| DE | 1935805 U | 3/1966 | |
| DE | 1942341 03 | 9/1979 | |
| DE | 2613944 03 | 7/1981 | |
| DE | 19739359 A1 | 5/1999 | |
| DE | 102007027046 A1 | 12/2008 | |
| DE | 102017109923 A1 | 11/2018 | |
| EP | 0607612 B1 | 3/1997 | |
| EP | 3476498 A1 * | 5/2019 | B08B 9/045 |
| JP | 2000042506 A | 2/2000 | |
| KR | 1020150115509 A | 10/2015 | |
| KR | 1020160143309 A | 12/2016 | |
| WO | WO-2020215059 A1 * | 10/2020 | B08B 9/045 |

OTHER PUBLICATIONS

RIDGID Tools, "RIDGID K-60 Sectional Drain Cleaner," <https://www.youtube.com/watch?v=-_HsRvo1zW8> video publicly available at least as early as Jul. 14, 2009.

* cited by examiner

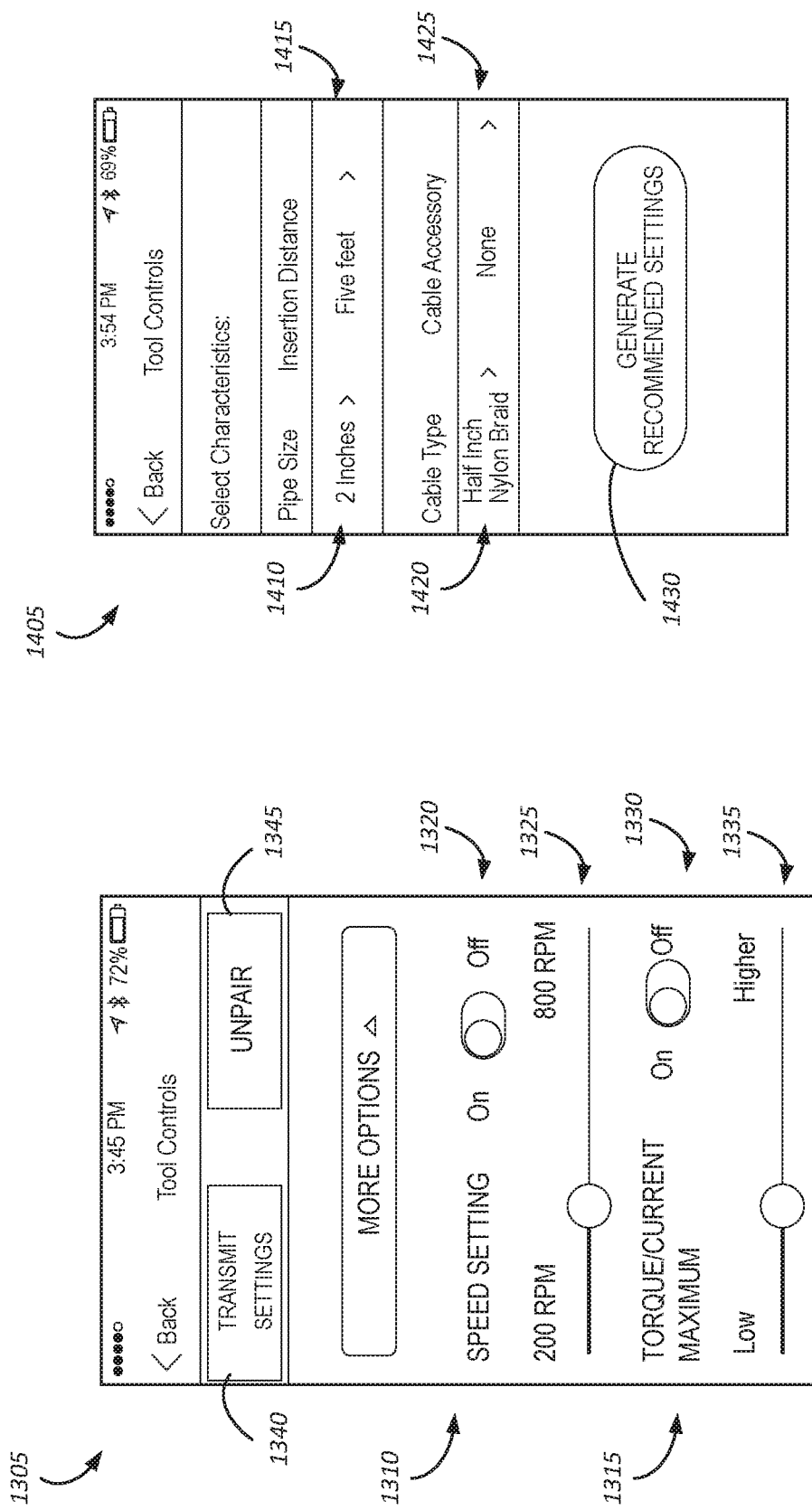

MOTOR CONTROL OF A DRAIN CLEANING MACHINE

RELATED APPLICATIONS

This application is a national phase filing under 35 U.S.C. 371 of International Application No. PCT/US2020/051813 filed Sep. 21, 2020, which claims the benefit of U.S. Provisional Patent Application No. 62/907,828, filed on Sep. 30, 2019, the entire content of which is hereby incorporated by reference.

FIELD OF THE INVENTION

The present invention relates to motor control of drain cleaning machines, and more particularly to motor control of sectional drain cleaning machines.

BACKGROUND OF THE INVENTION

Drum-type and sectional drain cleaning machines are both used to feed a snake (e.g., a cable or spring) through a drain to clean the drain. Drum-type machines rotate a drum containing the snake to feed the snake into the drain. In sectional drain cleaning machines, the snake is not stored in the machine and is instead fed into the machine.

SUMMARY OF THE INVENTION

One embodiment includes a drain cleaning machine for moving a snake in a drain. The drain cleaning machine may include a snake passage defining a snake axis, a brushless direct current (DC) motor configured to rotate a snake about the snake axis, and power switching elements configured to control an amount of current provided to the brushless DC motor. The drain cleaning machine may further include a motor position sensor and an electronic processor coupled to the power switching elements and to the motor position sensor. The electronic processor may be configured to receive motor positional information from the motor position sensor and control the power switching elements to drive the brushless DC motor based at least partially on the motor positional information. In a first operating range when a load experienced by the brushless DC motor is less than or equal to a predetermined load, the electronic processor may be configured to control the power switching elements to drive the brushless DC motor at an approximately constant speed regardless of the load experienced by the brushless DC motor. In a second operating range when the load experienced by the brushless DC motor is greater than the predetermined load, the electronic processor may be configured to control the power switching elements to drive the brushless DC motor at a decreasing speed as the load experienced by the brushless DC motor increases.

Another embodiment includes a method for controlling a drain cleaning machine to move a snake in a drain. The method may include determining, with an electronic processor of the drain cleaning machine, motor positional information of a brushless DC motor of the drain cleaning machine. The brushless DC motor may be configured to rotate a snake about a snake axis defined by a snake passage. The method may further include controlling, with the electronic processor, power switching elements to drive the brushless DC motor based at least partially on the motor positional information. The power switching elements may be configured to control an amount of current provided to the brushless DC motor. The method may further include in a first operating range when a load experienced by the brushless DC motor is less than or equal to a predetermined load, controlling, with the electronic processor, the power switching elements to drive the brushless DC motor at an approximately constant speed regardless of the load experienced by the brushless DC motor. The method may further include in a second operating range when the load experienced by the brushless DC motor is greater than the predetermined load, controlling, with the electronic processor, the power switching elements to drive the brushless DC motor at a decreasing speed as the load experienced by the brushless DC motor increases.

Another embodiment includes a drain cleaning machine for moving a snake in a drain. The drain cleaning machine may include a snake passage defining a snake axis, a brushless direct current (DC) motor configured to rotate a snake about the snake axis, and power switching elements configured to control an amount of current provided to the brushless DC motor. The drain cleaning machine may further include a motor position sensor and an electronic processor coupled to the power switching elements and to the motor position sensor. The electronic processor may be configured to receive motor positional information from the motor position sensor and control the power switching elements to drive the brushless DC motor based at least partially on the motor positional information. The electronic processor may also be configured to control the power switching elements to drive the brushless DC motor to operate at one or more user selectable parameters. The one or more user selectable parameters may include a speed that is user selectable, an output torque that is user selectable, or both.

Other features and aspects of the invention will become apparent by consideration of the following detailed description and accompanying drawings.

BRIEF DESCRIPTION OF THE DRAWINGS

FIG. 28 illustrates a user interface that may be displayed on a touch display of the external device of FIG. 22 according to one embodiment.

FIG. 29 illustrates another a user interface that may be displayed on the touch display of the external device of FIG. 22 according to one embodiment.

DETAILED DESCRIPTION

Figure 1:
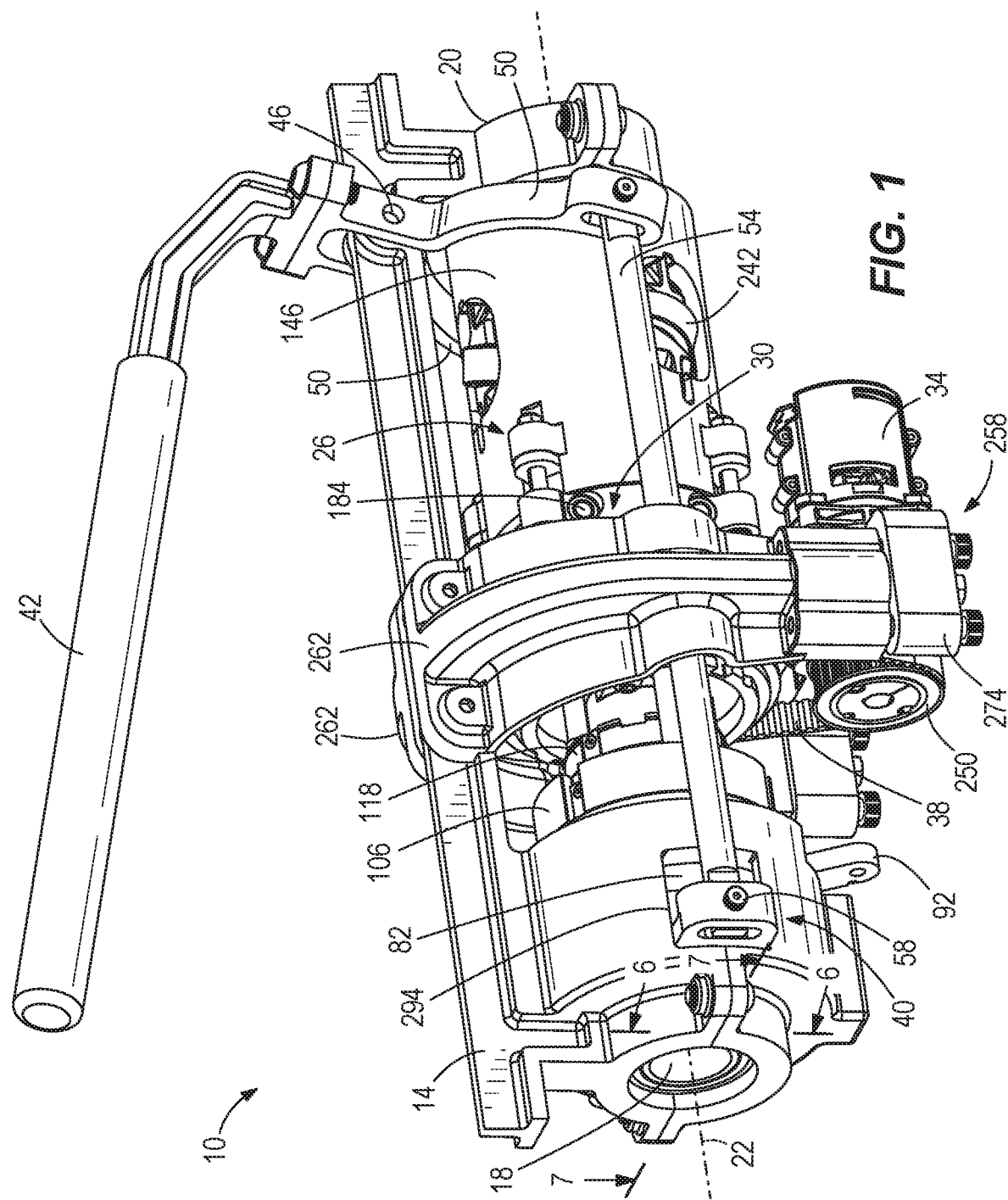
FIG. 1 is a perspective view of a drain cleaning machine according to one example embodiment.

Before any embodiments are explained in detail, it is to be understood that the embodiments are not limited in their application to the details of construction and the arrangement of components set forth in the following description or illustrated in the following drawings. The embodiments are capable of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the embodiments. Furthermore, and as described in subsequent paragraphs, the specific configurations illustrated in the drawings are intended to exemplify embodiments and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value. When the term "and/or" is used in this application, it is intended to include any combination of the listed components. For example, if a component includes A and/or B, the component may include solely A, solely B, or A and B.

Figure 2:
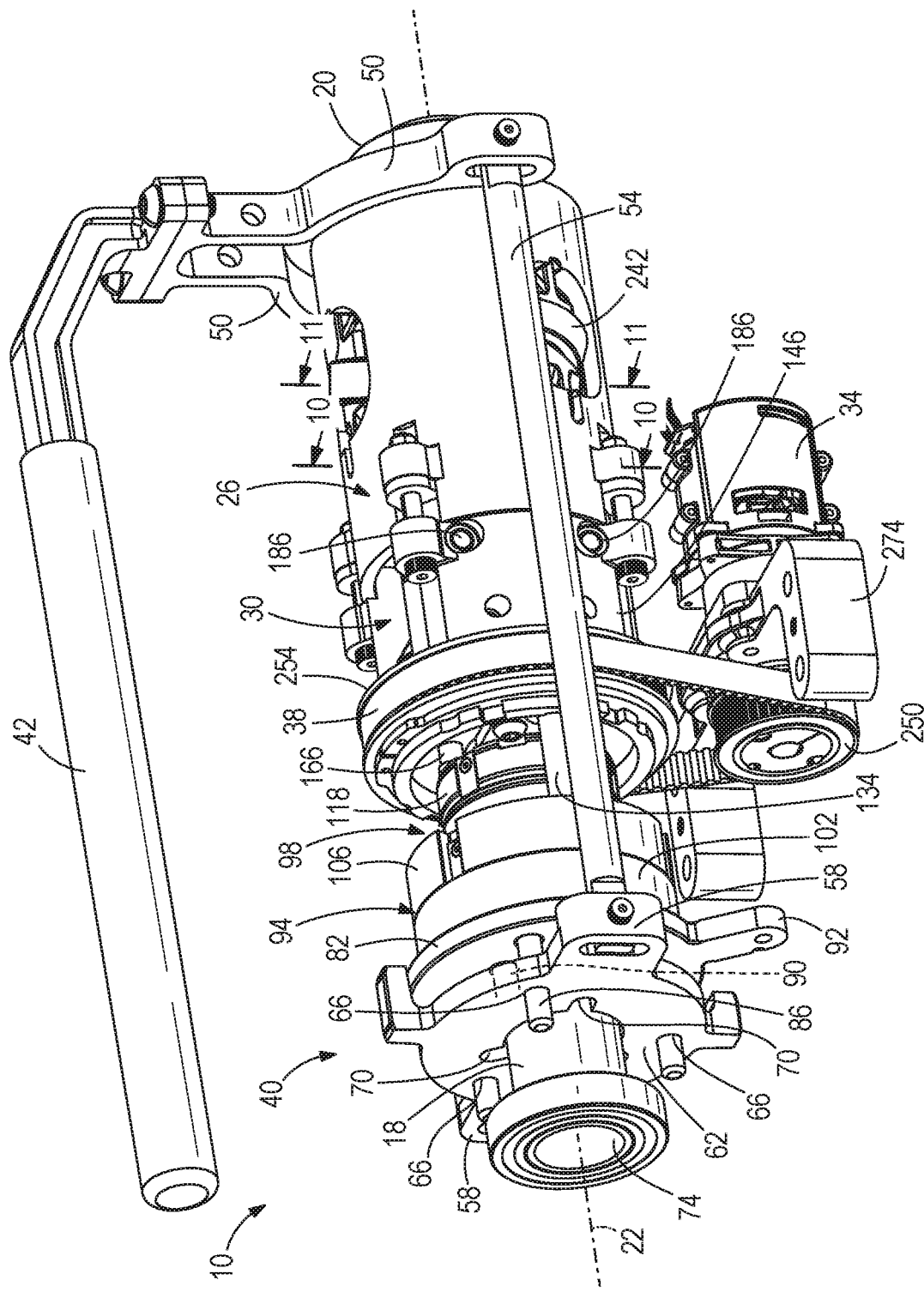
FIG. 2 is a perspective view of the drain cleaning machine of FIG. 1, with portions removed.

As shown in FIGS. 1 and 2, a drain cleaning machine 10 includes an inner frame 14, a snake outlet tube 18 and snake inlet tube 20 collectively defining a snake axis 22, a translate mechanism 26, a radial drive mechanism 30, and a motor 34 to rotate the feed and radial drive mechanisms 26, 30 about the snake axis 22. In the illustrated embodiment, the motor 34 is operatively coupled to and rotates the feed and radial drive mechanisms 26, 30 via a belt 38. In some embodiments, the drain cleaning machine 10 is a direct current (DC) battery powered drain cleaning machine in which the motor 34 is powered by a battery or battery pack as described below. The translate mechanism 26 is used to translate a snake (e.g., a cable or spring) (not shown) along the snake axis 22 into or out of a drain. The radial drive mechanism 30 is used to spin the snake about the snake axis 22.

The drain cleaning machine 10 also includes a selection mechanism 40 including an actuating lever 42, a push plate 62, and a selection plate 82. The actuating lever 42 pivots on the inner frame 14 about a pivot point 46 between an activated position shown in FIG. 2 and a deactivated position shown in FIG. 1. In some embodiments, the actuating lever 42 activates the motor 34 when set to the activated position. In alternative embodiments, instead of the actuating lever 42, a separate switch or actuator, such as a foot pedal, can be used to activate the motor 34. As described in further detail below, the selection mechanism 40 allows an operator to switch between selecting the translate mechanism 26 or the radial drive mechanism 30 in manipulating the snake. The actuating lever 42 has a pair of arms 50 respectively coupled to a pair of pull linkages 54. The pull linkages 54 are coupled to a pair of arms 58 of the push plate 62 that can translate in a direction parallel to the snake axis 22, as explained in further detail below and in U.S. patent application Ser. No. 16/535,321, the entire contents of which are herein incorporated by reference.

Figure 3:
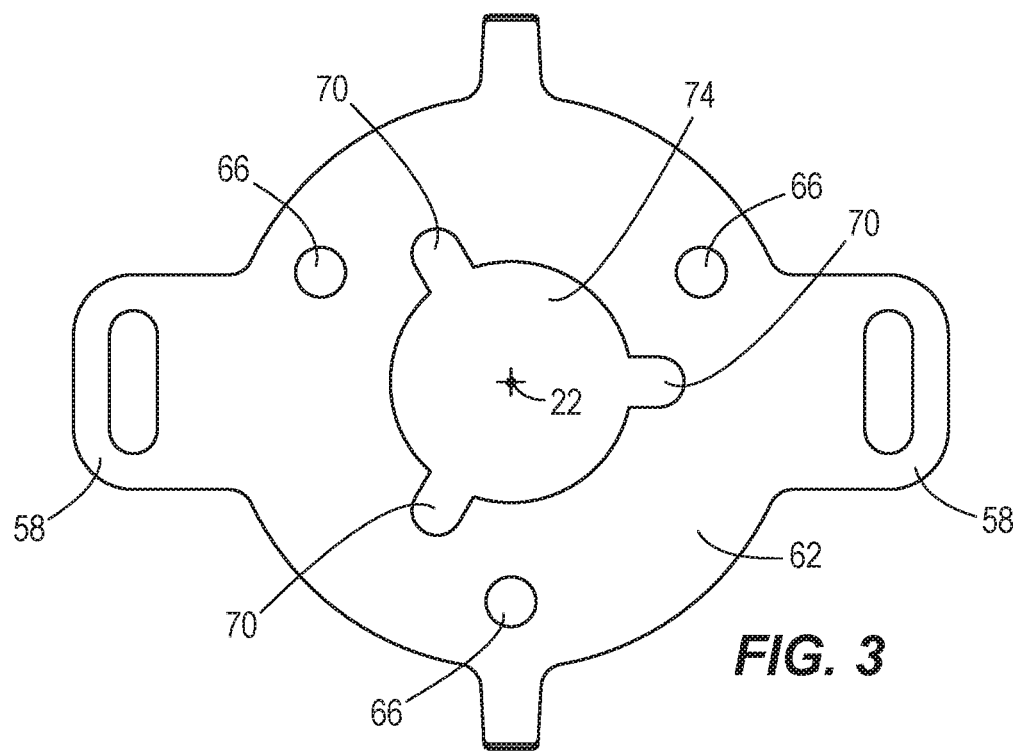
FIG. 3 is a plan view of a push plate of the drain cleaning machine of FIG. 1.

As shown in FIG. 3, the push plate 62 includes a plurality of outer apertures 66 and a plurality of inner apertures 70. The outer apertures 66 and inner apertures 70 are arranged parallel to the snake axis 22. In the illustrated embodiment, the push plate 62 includes three outer apertures 66 and three inner apertures 70. In other embodiments, the push plate 62 may include more or fewer outer and inner apertures 66, 70. The three inner apertures 70 extend from a central aperture 74 to accommodate the snake outlet tube 18 and to allow the push plate 62 to translate along the snake outlet tube 18.

Figure 4:
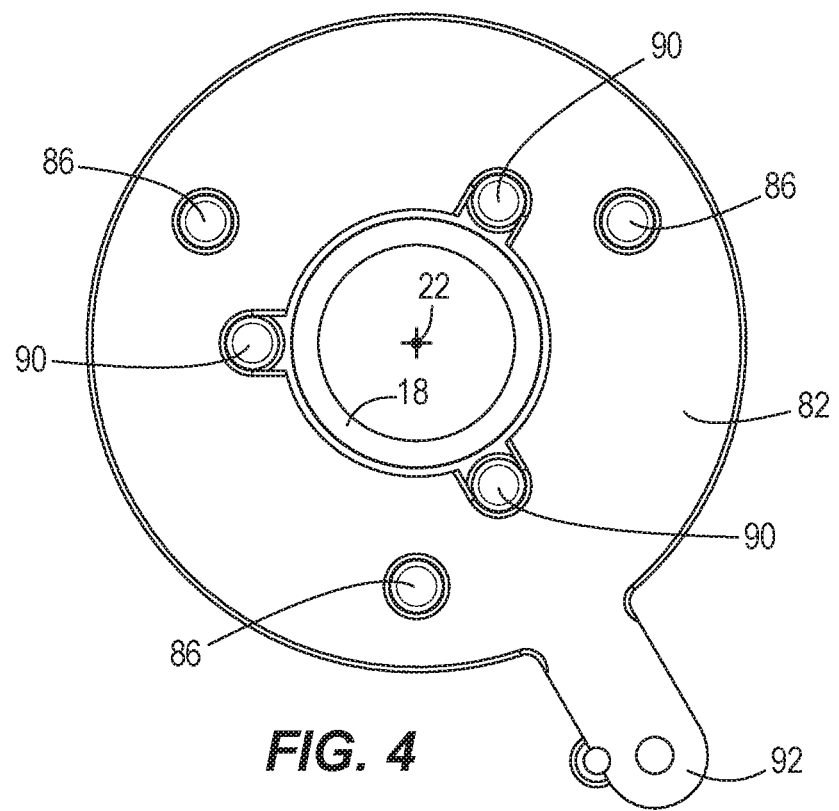
FIG. 4 is a plan view of a selection plate of the drain cleaning machine of FIG. 1.
Figure 5:
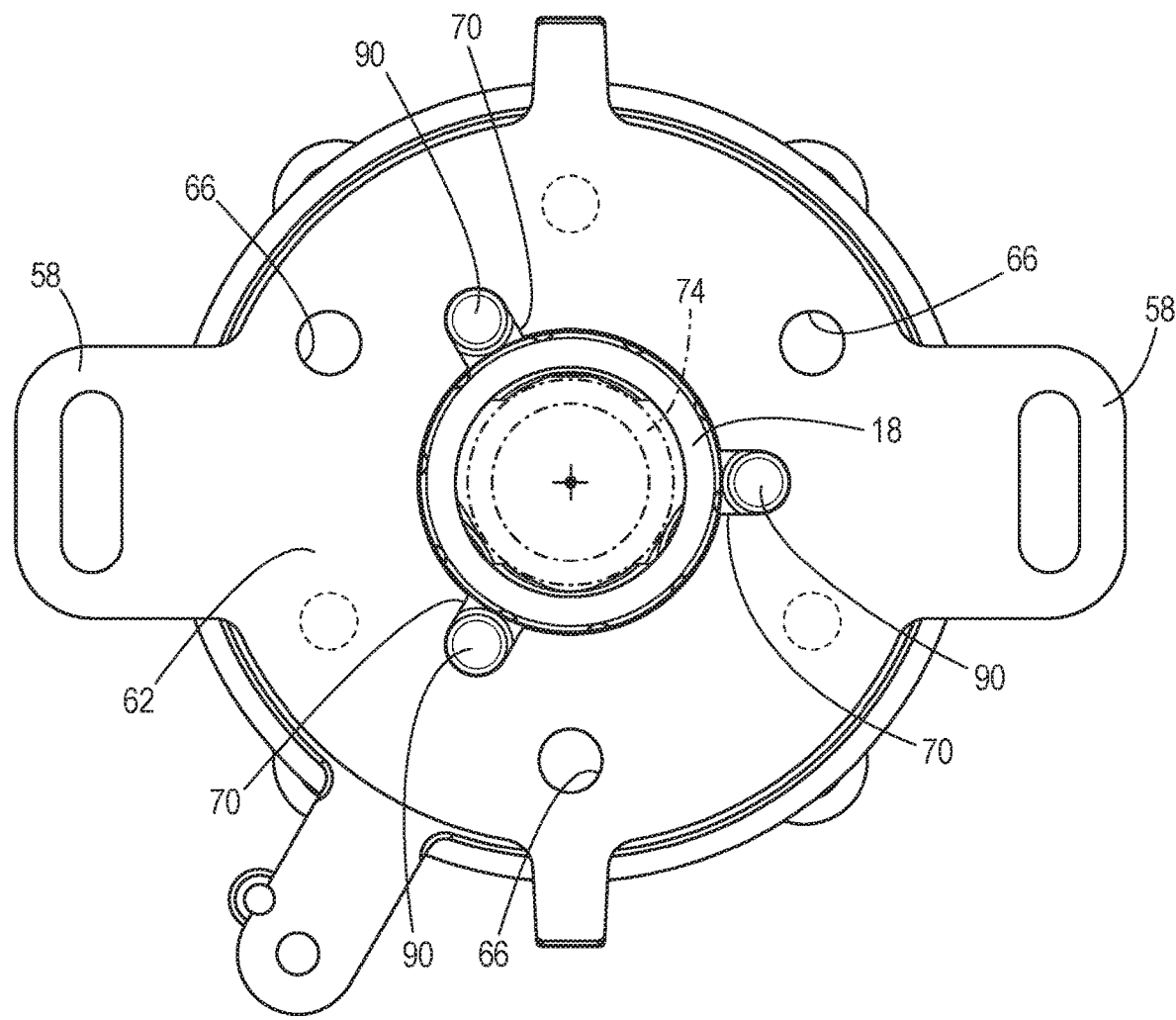
FIG. 5 is a plan view of the push plate and the selection plate of the drain cleaning machine of FIG. 1, with the selection plate in a translate position.
Figure 12:
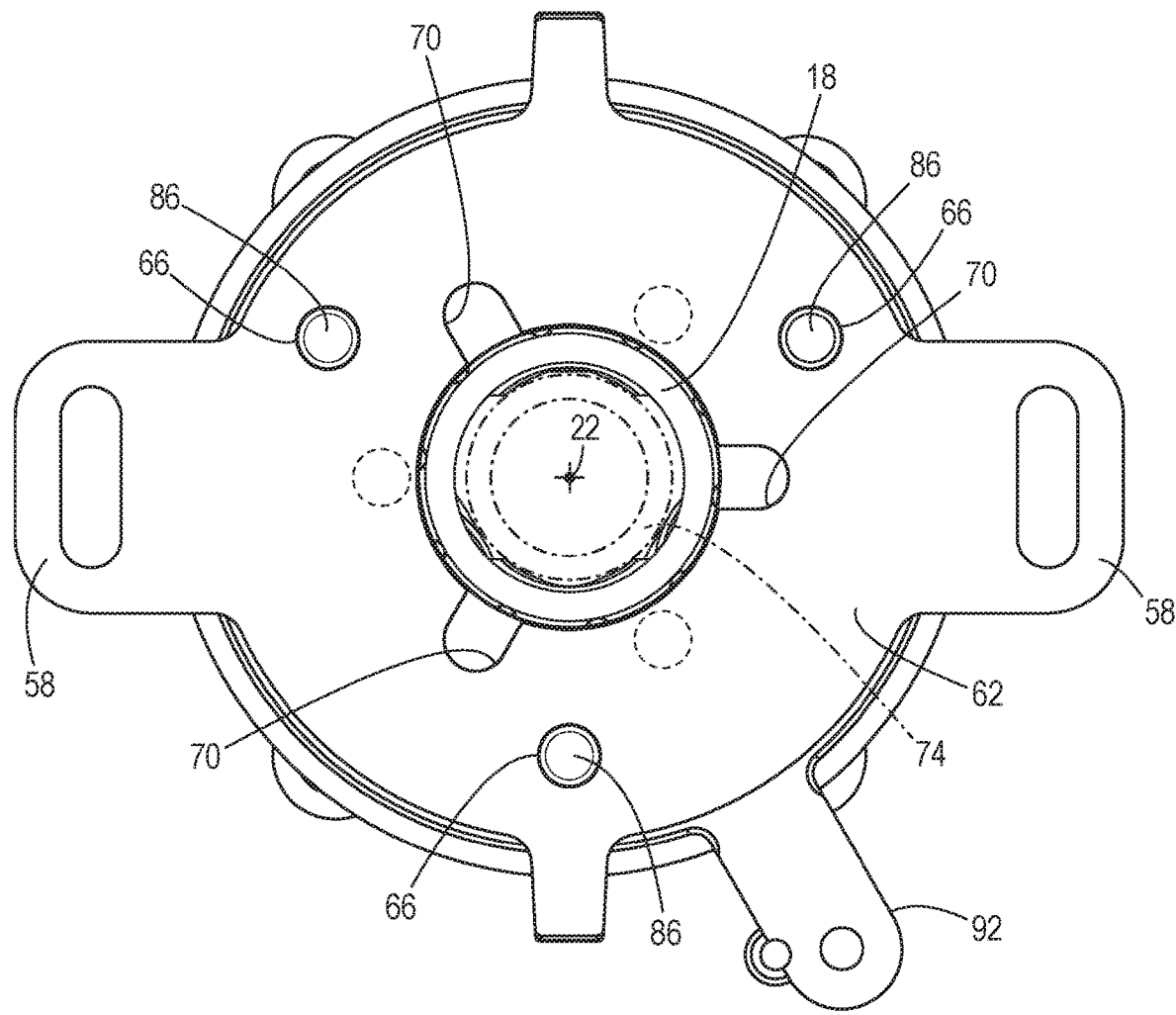
FIG. 12 is a plan view of the push plate and the selection plate of the drain cleaning machine of FIG. 1, with the selection plate in a radial drive position.

With reference to FIG. 4, the selection plate 82 supports a plurality of outer pins 86 and a plurality of inner pins 90 that are also part of the selection mechanism 40. The selection plate 82 includes a finger 92 to allow an operator to rotate the selection plate between a translate position shown in FIGS. 5 and 6 and a radial drive position shown in FIGS. 4, 12, and 13. When the selection plate 82 is in the translate position, the inner pins 90 are aligned with the inner apertures 70 of the push plate 62, and the outer pins 86 are not aligned with the outer apertures 66, as shown in FIG. 5. When the selection plate 82 is in the radial drive position, the outer pins 86 are aligned with the outer apertures 66 of the push plate 62, and the inner pins 90 are not aligned with the inner apertures 70, as shown in FIG. 12. As explained in further detail below, when the selection plate 82 is in the translate position, the selection mechanism 40 can switch the translate mechanism 26 from a disengaged state to an engaged state. When the selection plate 82 is in the radial drive position, the selection mechanism 40 can switch the translate mechanism 26 from a disengaged state to an engaged state.

Figure 6:
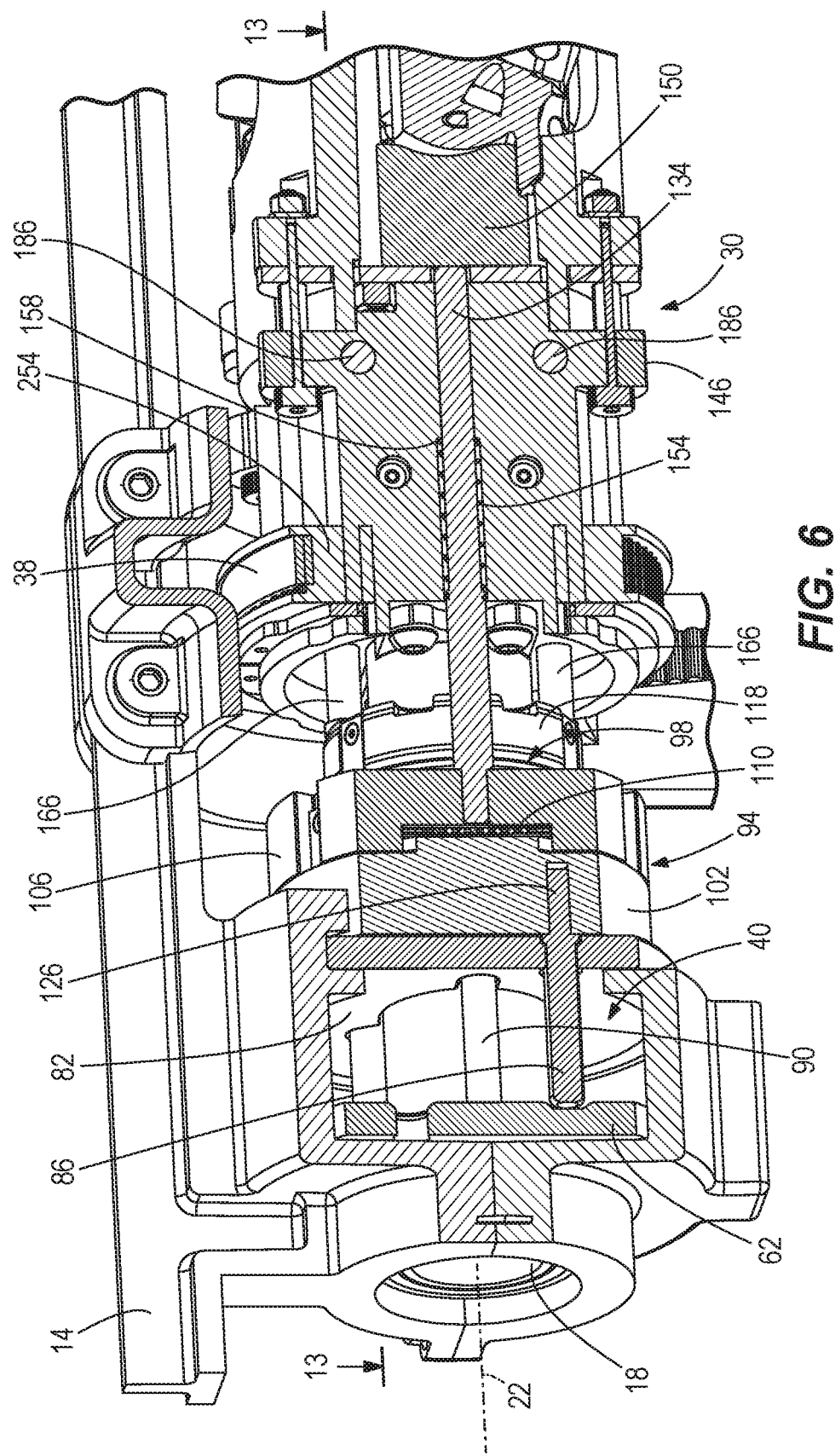
FIG. 6 is a cross-sectional view of the drain cleaning machine taken along section line 6-6 of FIG. 1.
Figure 7:
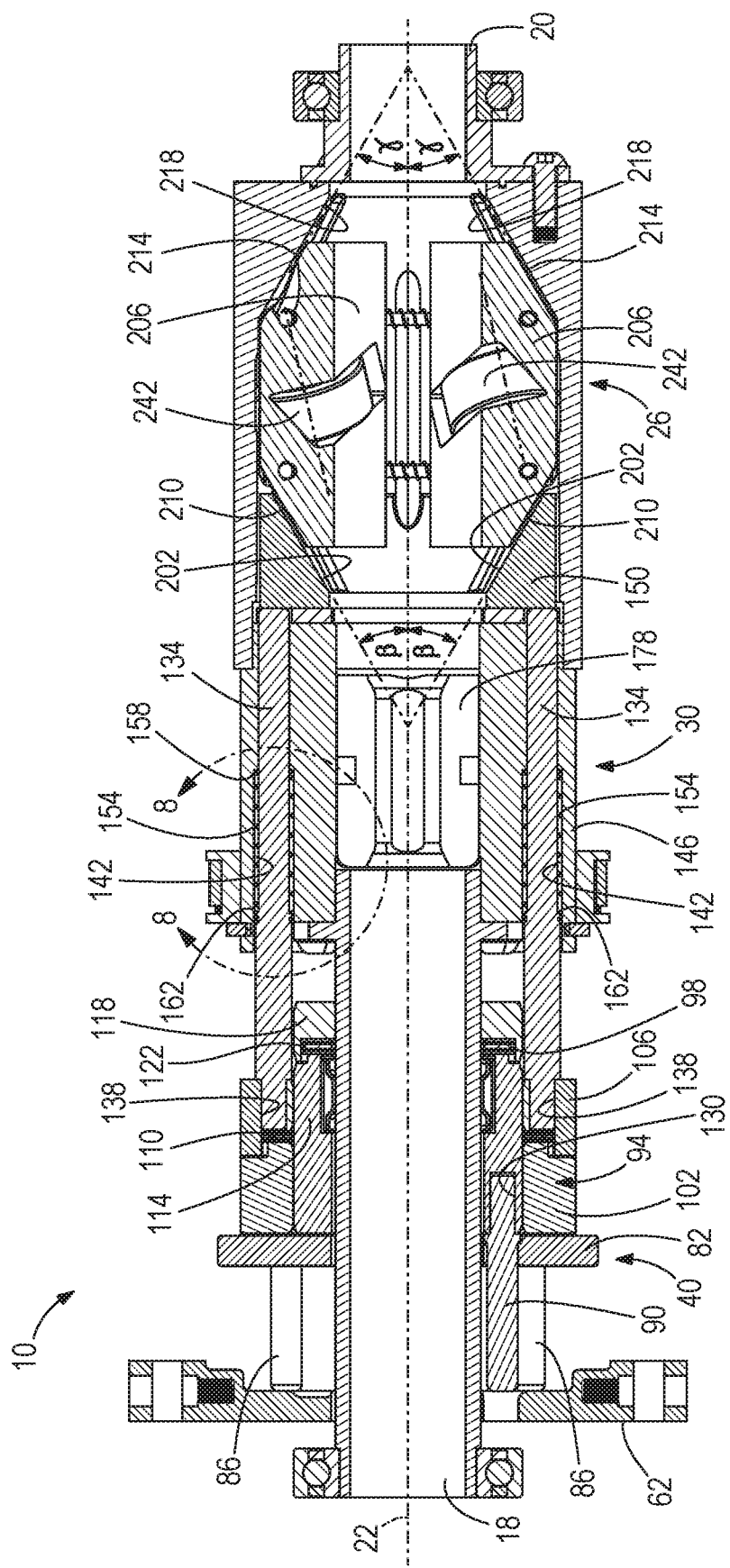
FIG. 7 is a cross-sectional view of the drain cleaning machine taken along section line 7-7 of FIG. 1.
Figure 13:
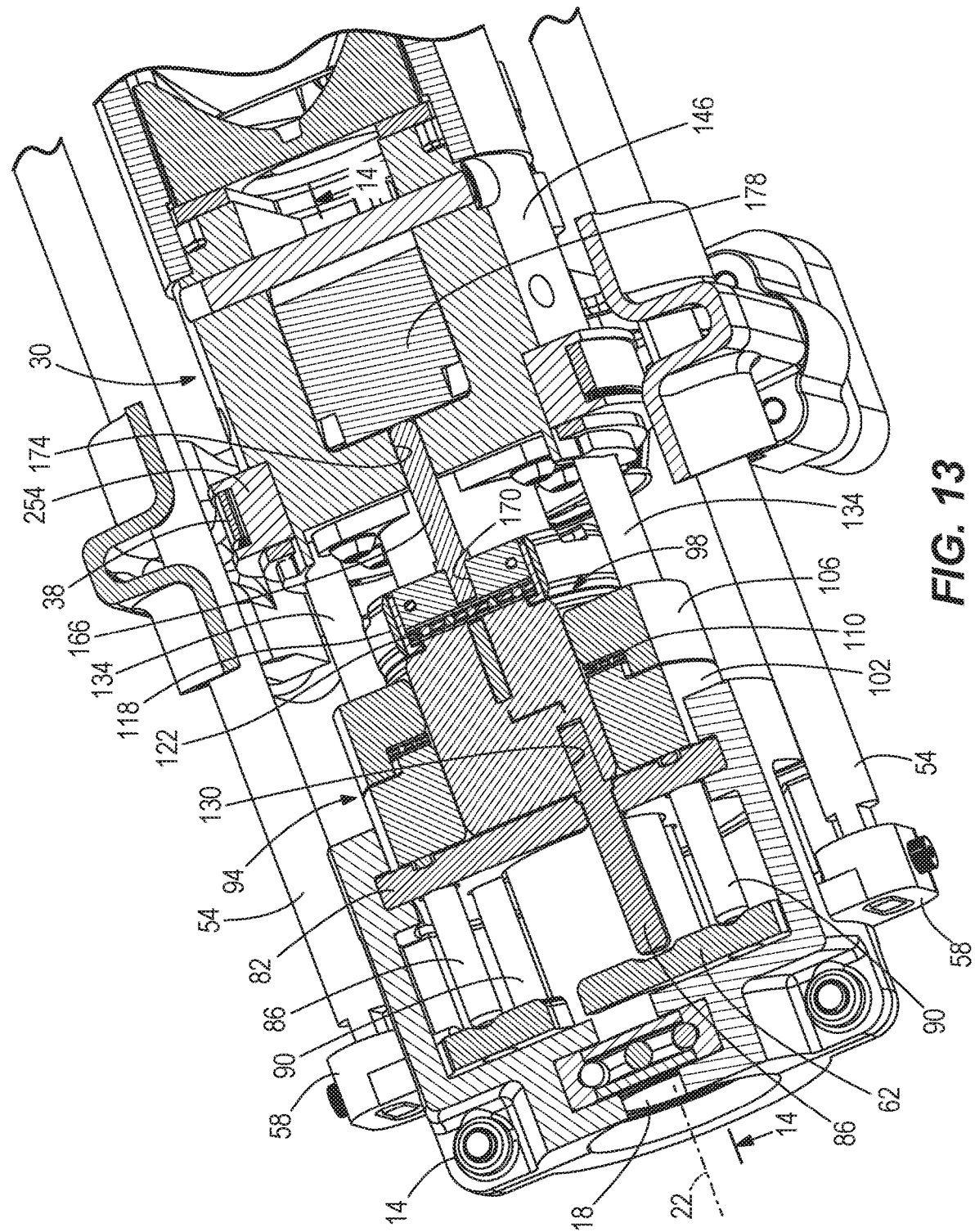
FIG. 13 is a cross-sectional view of a portion of the drain cleaning machine of FIG. 1.
Figure 14:
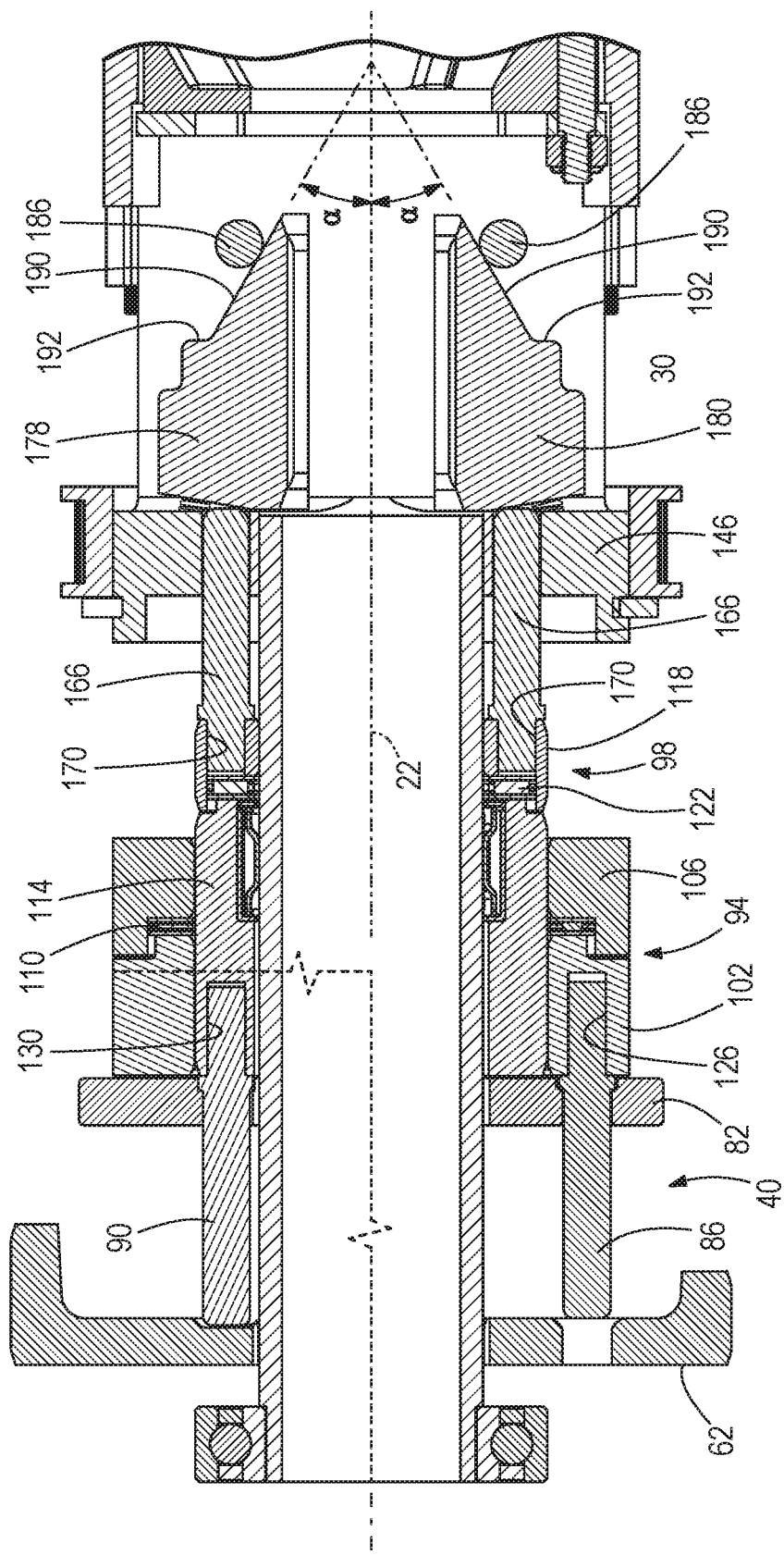
FIG. 14 is a cross sectional view of a portion of the drain cleaning machine taken along section line 14-14 of FIG. 13.

With reference to FIGS. 2, 6, 7, 9, 13 and 14, the drain cleaning machine 10 also includes an outer thrust assembly 94 and an inner thrust assembly 98. Both the outer and inner thrust assemblies 94, 98 are supported by the snake outlet tube 18. In other embodiments, the outer and inner thrust assemblies 94, 98 are not supported by the snake outlet tube 18, and instead are respectively supported by outer push rods 134 and inner push rods 166, described below. The outer thrust assembly 94 includes a first race 102, a second race 106, and an outer thrust bearing 110 with a plurality of rollers in between the first and second races 102, 106. The inner thrust assembly 98 includes a first race 114, a second race 118, and an inner thrust bearing 122 with a plurality of rollers in between the first and second races 114, 118. With reference to FIGS. 6 and 14, the outer pins 86 of the selection mechanism 40 are arranged in bores 126 of the first race 102 of the outer thrust assembly 94. With reference to FIGS. 7 and 13, the inner pins 90 of the selection mechanism 40 are arranged in bores 130 of the first race 114 of the inner thrust assembly 98.

Figure 8:
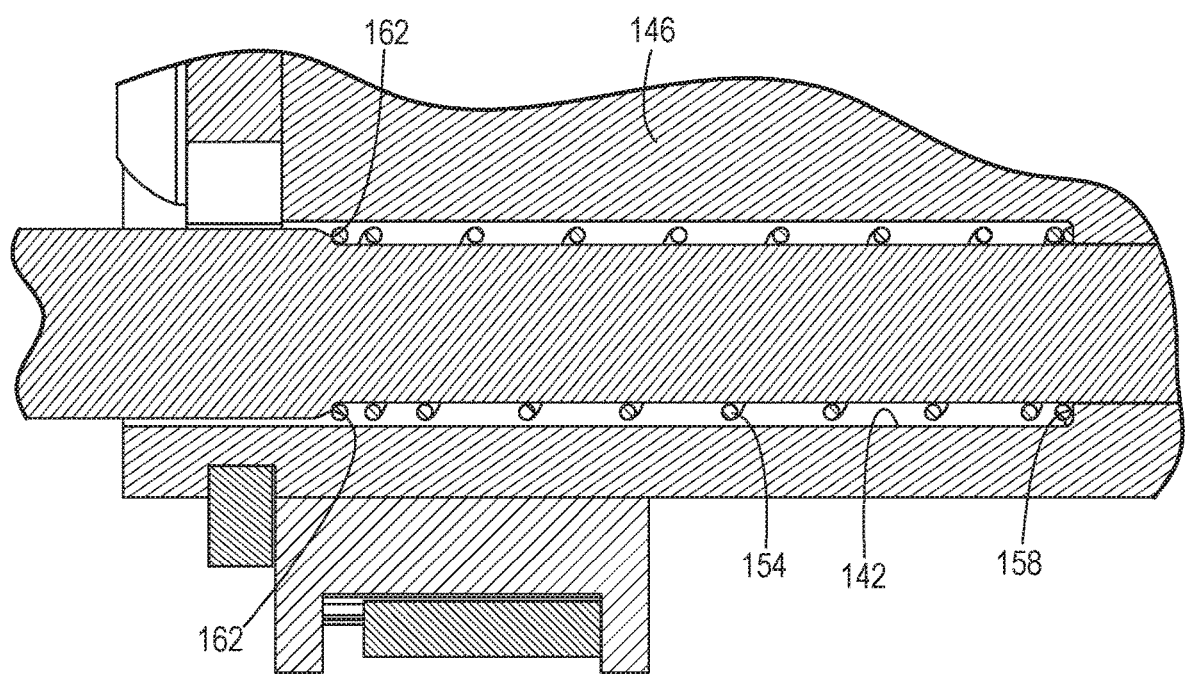
FIG. 8 is an enlarged view of a portion of the cross-section of the drain cleaning machine of FIG. 7.
Figure 9:
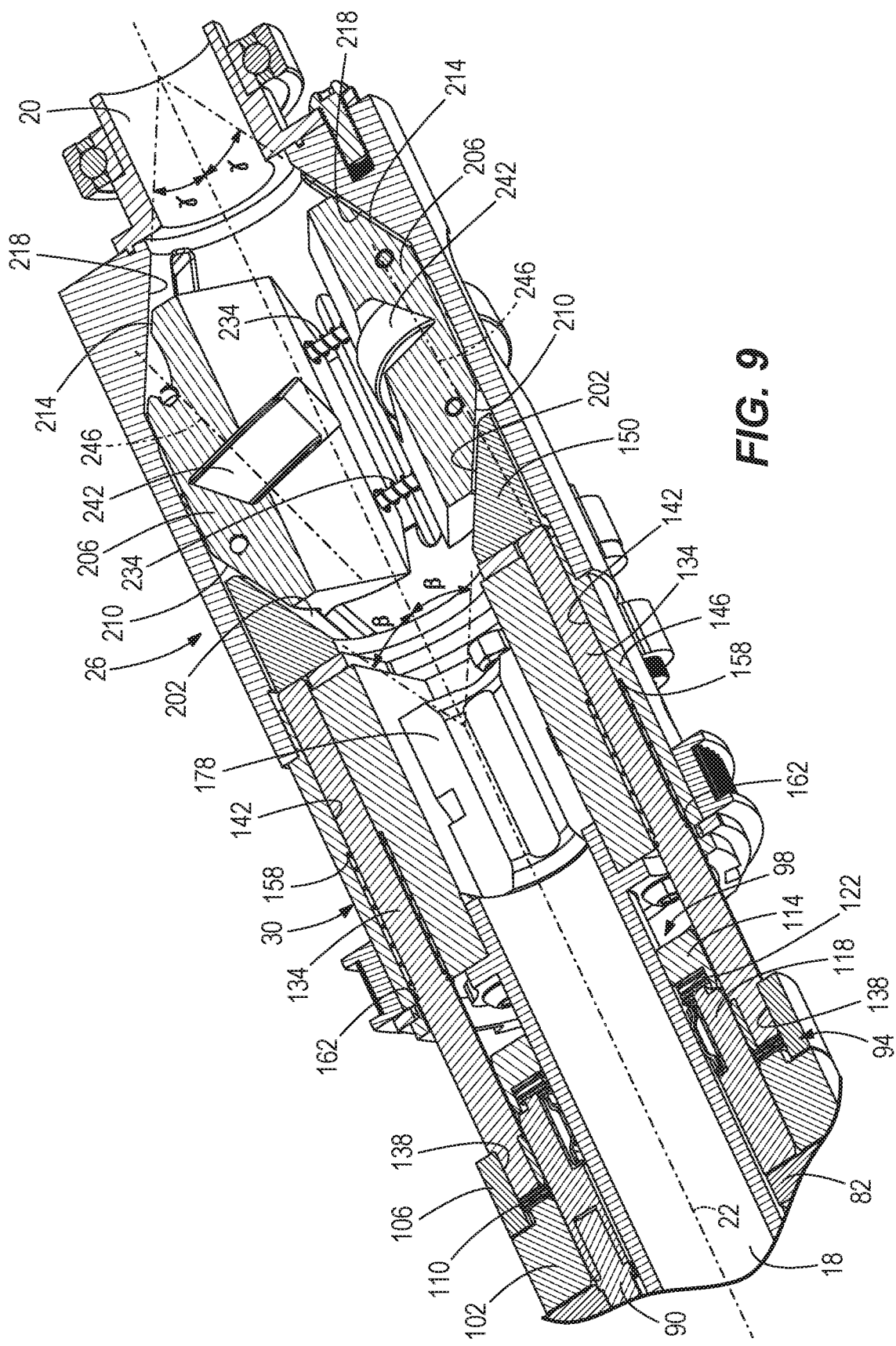
FIG. 9 is a perspective, cross-sectional view of a portion of the drain cleaning machine taken along section line 7-7 of FIG. 1.

With reference to FIGS. 7 and 9, a pair of outer push rods 134 is arranged in bores 138 of the second race 106 of the outer thrust assembly 94. The outer push rods 134 respectively extend through bores 142 of a rotating shell 146 that supports both the feed and radial drive mechanisms 26, 30, such that both the translate and radial drive mechanism 26, 30 are rotatable with the rotating shell 146. The outer push rods 134 are both abuttable against a push cone 150 of the translate mechanism 26. As shown in FIGS. 6-8, a spring 154 is arranged against a spring seat 158 within each bore 142 of the rotating shell 146. The springs 154 are each biased against a shoulder 162 of each outer push rod 134, such that each of the push rods 134 is biased away from the push cone 150 and toward the second race 106 of the outer thrust assembly 94.

Figure 15:
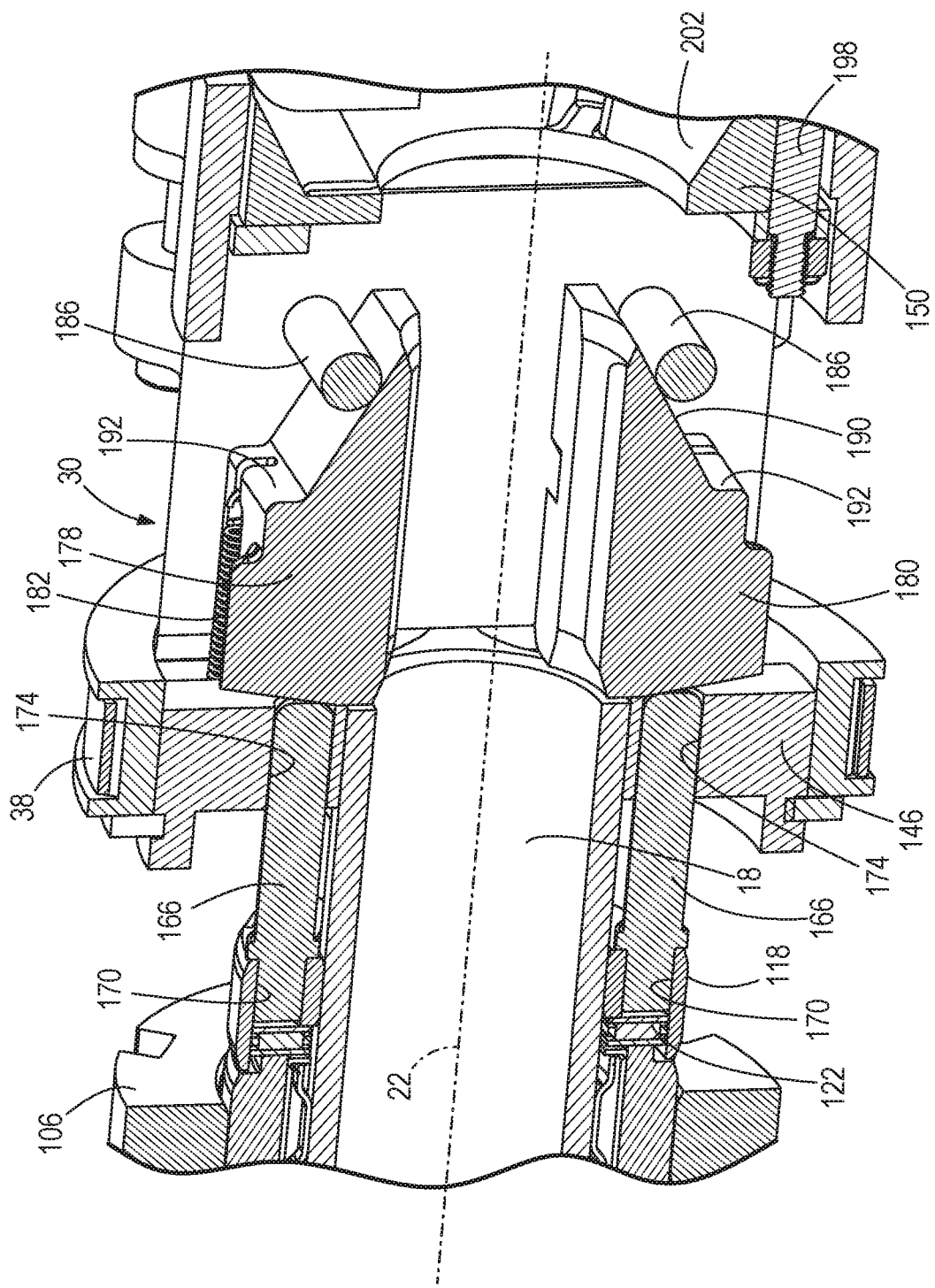
FIG. 15 is a perspective, cross-sectional view of the portion of the drain cleaning machine of FIG. 14.
Figure 16:
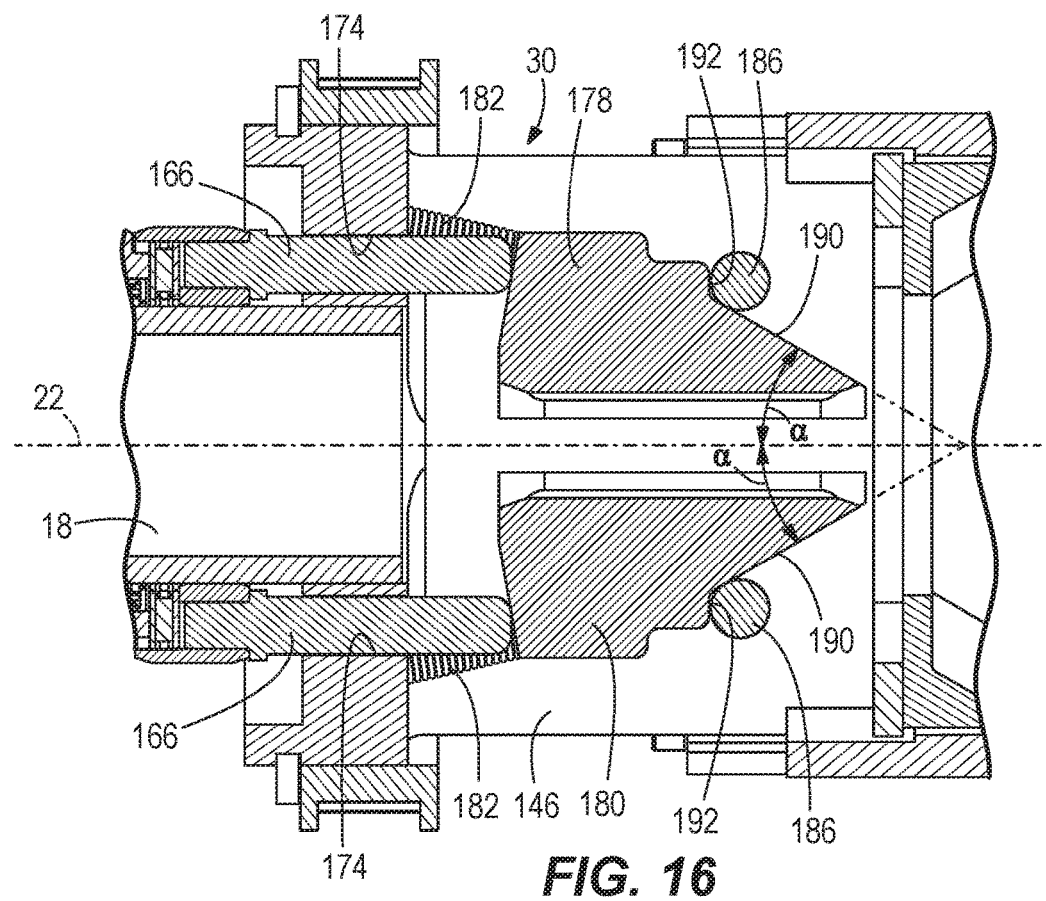
FIG. 16 is a cross-sectional view of part of the drain cleaning machine shown in FIG. 14.

With reference to FIGS. 14-16, a pair of inner push rods 166 is arranged in bores 170 of the second race 118 of the inner thrust assembly 98. The inner push rods 166 respectively extend through bores 174 in the rotating shell 146 and are respectively abuttable against a first collet 178 and a second collet 180 of the radial drive mechanism 30. The collets 178, 180 are arranged in the rotating shell 146 for rotation therewith and are translatable within the rotating shell 146, as described in further detail below. As shown in FIGS. 15 and 16, a spring 182 is secured between each collet 178, 180 and the rotating shell 146, such that each collet 178, 180 is biased toward its respective inner push rod 166 and away from a respective cross pin 186 of the radial drive mechanism 30.

Each collet 178, 180 has a sloped face 190 that is arranged at an acute angle α with respect to the snake axis 22 and is engageable with the cross pin 186. At the edge of the sloped face 190, each collet 178, 180 includes a shoulder 192. As explained in further detail below, when the collets 178, 180 are moved toward the snake axis 22, the radial drive mechanism 30 is in an engaged state, as shown in FIG. 16. When the collets 178, 180 are moved by the springs 182 away from the snake axis 22, the radial drive mechanism 30 is in a disengaged state, as shown in FIGS. 14 and 15.

In some embodiments, the springs 182 may be omitted. In these embodiments, when translate mechanism 26 is engaged and the radial drive mechanism 30 is not engaged, the centrifugal force experienced by the collets 178, 180 during rotation of the rotating shell 146 causes the collets 178 to move away from the snake axis 22. Thus, springs 182 are not required to inhibit the collets 178, 180 from engaging the snake when translate mechanism 26 is engaged and the radial drive mechanism 30 is not engaged.

With reference to FIGS. 1, 2, 7 and 9-11, the push cone 150 is arranged within the rotating shell 146 and coupled for rotation therewith. The push cone 150 is translatable in a direction parallel to the snake axis 22 within the rotating shell 146 along a plurality of guide rods 198 (FIGS. 10 and 11) fixed along the length of the rotating shell 146. The push cone 150 has an inner face 202 whose inner diameter increases when moving in a direction away from the rotating shell 146. Thus, the inner face 202 is arranged at an acute angle β with respect to the snake axis 22, as shown in FIG. 7.

The translate mechanism 26 also includes a plurality of wheel collets 206 arranged within the rotating shell 146. Each wheel collet 206 includes a first face 210 that is pushable by the inner face 202 of the push cone 150 and is arranged at the acute angle β with respect to the snake axis 22. Each wheel collet 206 includes an opposite second face 214 arranged at an acute angle γ with respect to the snake axis 22 and moveable along an inner face 218 of the rotating shell 146, which is also arranged at the acute angle γ with respect to the snake axis 22.

Figure 10:
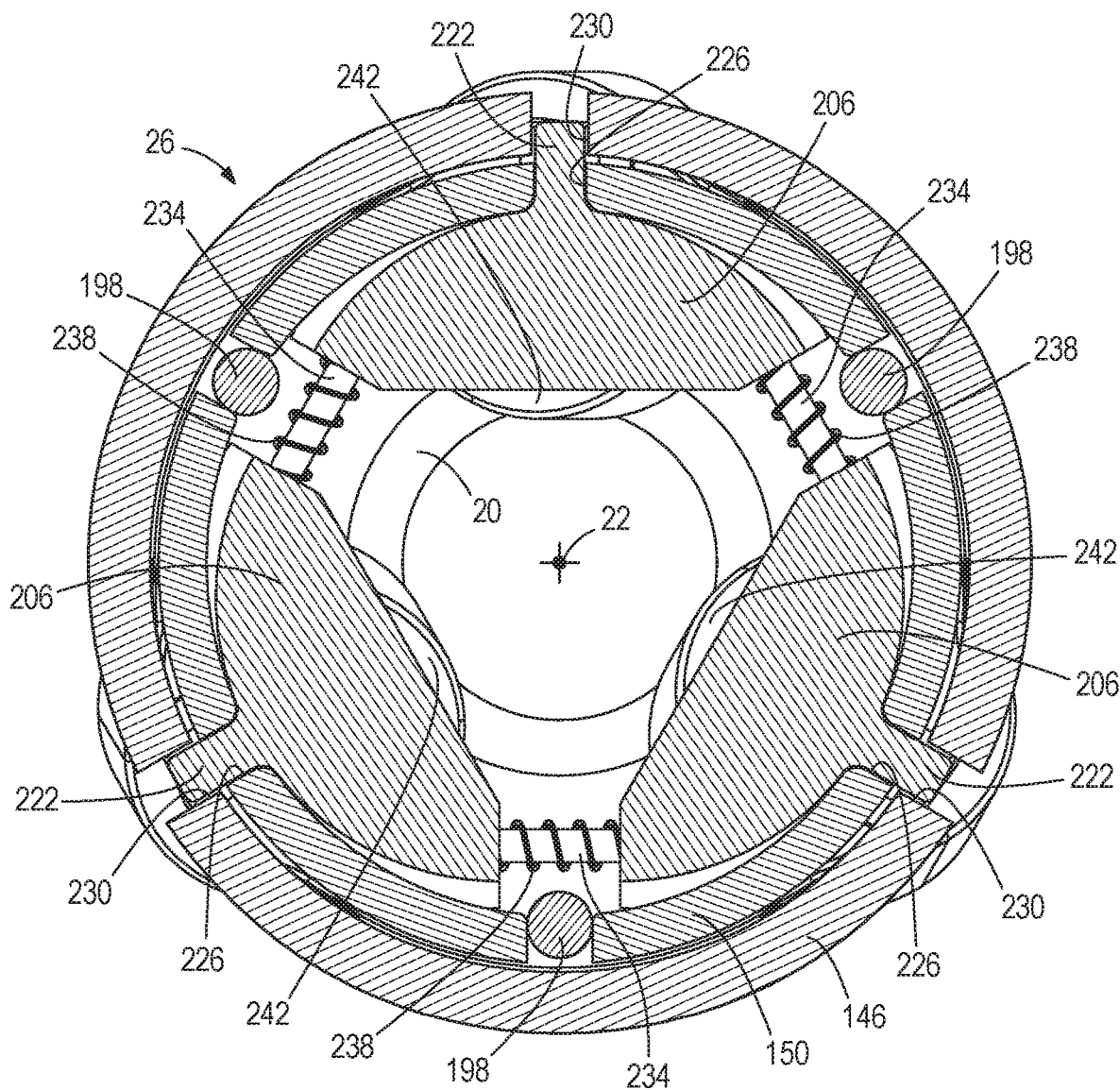
FIG. 10 is a cross-sectional view of a translate mechanism of the drain cleaning machine taken along section line 10-10 of FIG. 2.
Figure 11:
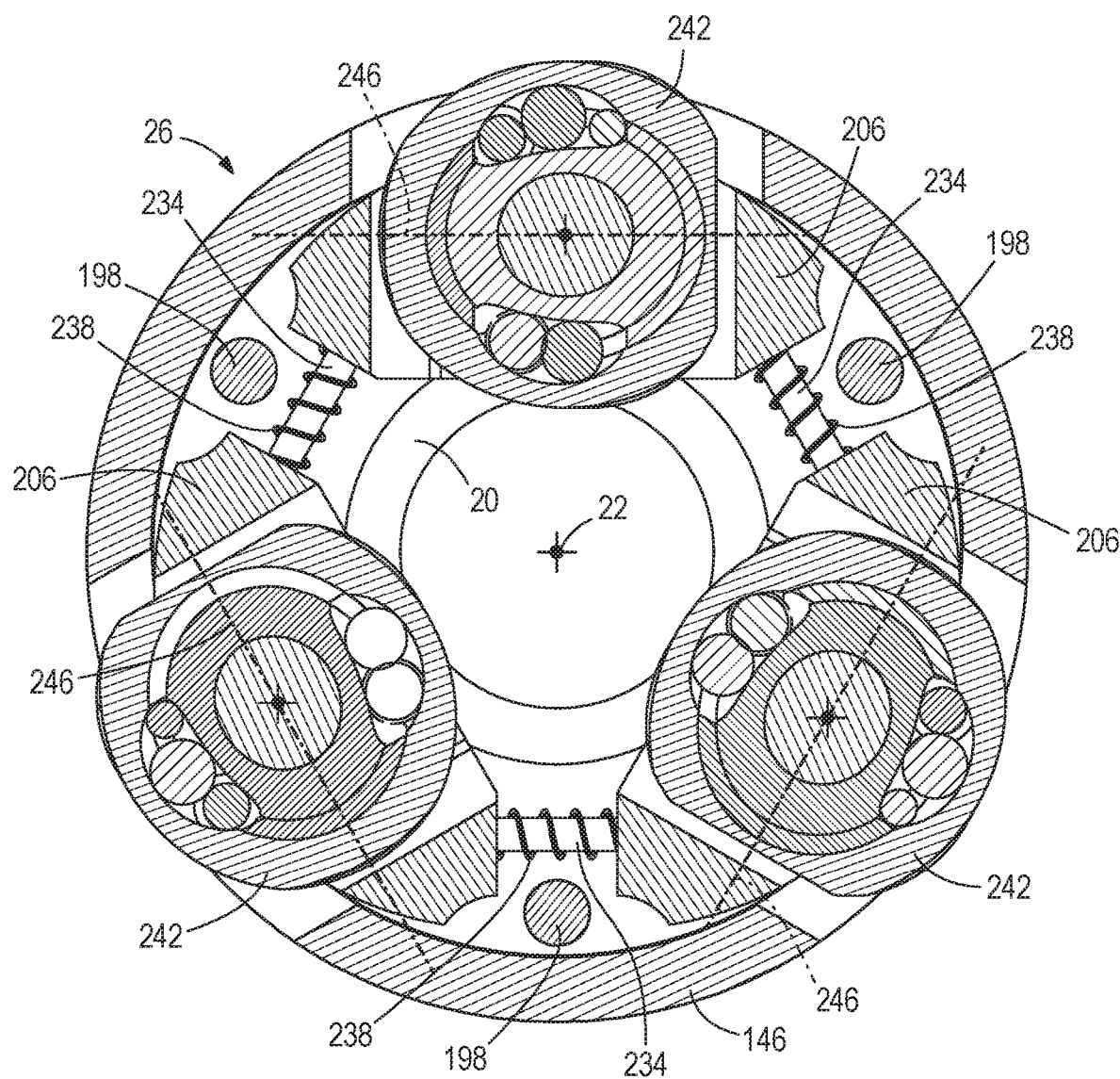
FIG. 11 is a cross-sectional view of the translate mechanism of the drain cleaning machine taken along section line 11-11 of FIG. 2.

As shown in FIG. 10, the wheel collets 206 each include a radially outward-extending key 222 that fits within keyways 226 of the push cone 150 and keyways 230 of the rotating shell 146, such that the collets rotate with the push cone 150 and rotating shell 146. A pin 234 is arranged between each pair of adjacent wheel collets 206, and a compression spring 238 is arranged around each pin 234 and seated against the adjacent wheel collets 206, such that each pair of adjacent wheel collets 206 are biased away from each other by the spring 238. Each wheel collet 206 rotatably supports a wheel 242, or radial bearing, having a wheel axis 246. As shown in FIGS. 7, 9 and 11, the wheel axes 246 are skewed (i.e., non-parallel) with each other, and the wheel axes 246 are skewed (i.e., non-parallel) with the snake axis 22. As explained in further detail below, when the translate mechanism 26 is in an engaged state, the wheel collets 206 and wheels 242 are moved toward the snake axis 22. When the translate mechanism 26 is in a disengaged state, the wheel collets 206 and wheels 242 are allowed to be biased away from each other, and thus away from the snake axis 22.

Figure 17:
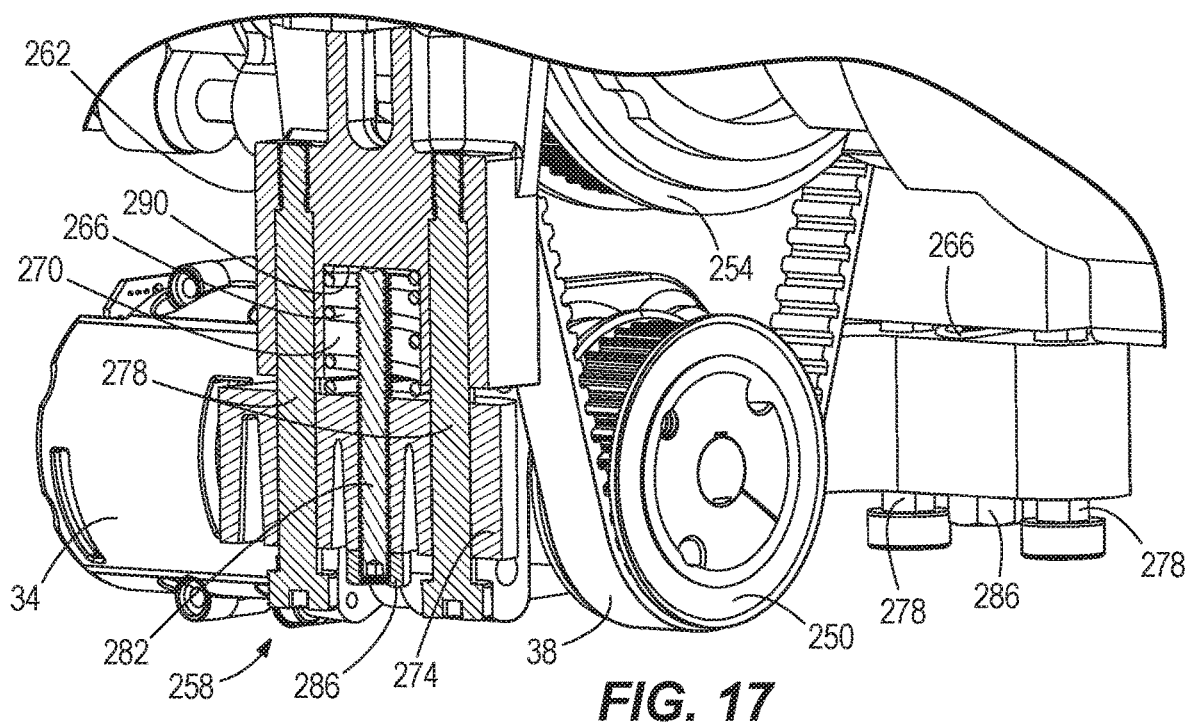
FIG. 17 is a cross-sectional view of a portion of the drain cleaning machine of FIG. 1, illustrating a tensioning assembly.

With reference to FIG. 17, the drain cleaning machine 10 also includes a first pulley 250 to transmit torque from the motor 34 to the rotating shell 146 via the belt 38. Specifically, the belt 38 engages with a second pulley 254 fixed on the rotating shell 146 of the radial drive mechanism 30. The drain cleaning machine 10 also includes a tensioning assembly 258 for allowing the belt 38 to be installed and tensioned on first pulley 250. A pair of first support members 262 couple the tensioning assembly 258 to the frame 14. The tensioning assembly 258 includes a pair compression springs 266 (one on each side), respectively set within bores 270 respectively defined in the first support members 262. The springs 266 bias a second support member 274 of the tensioning assembly 258, which supports the motor 34 and first pulley 250, away from the first support members 262. The tensioning assembly 258 also includes a pair of shoulder bolts 278 threaded within each first support member 262 and respectively extending through the second support member 274. The tensioning assembly 258 further includes a pair of set screws 282 (one on each side), which are respectively threaded through the second support member 274 into the bores 270 of the first support members 262. A lock nut 286 threads onto each set screw 282.

Installation of the Belt 38

In order to install and tension the belt 38 onto the drain cleaning machine 10, the belt 38 is initially off the first pulley 250, but needs to be installed. To install the belt 38, an operator moves the second support member 274 toward the first support members 262, thereby compressing the springs 266 and moving the first pulley 250 toward the second pulley 254, allowing clearance for the belt 38 to be slipped on the first pulley 250. Prior to slipping on the belt 38 and while still holding the second support member 274 toward the first support members 262 to compress springs 266, the shoulder bolts 278 are installed through the second support member 274 and first support members 262 and threaded into the first support members 262. The belt 38 is then slipped on the first pulley 250, and the second support member 272 is then released to allow the springs 266 to expand and push the second support member 272 away from the first support members 262. This causes the belt 38 to become taut as the first pulley 250 is moved away from the second pulley 254. The set screws 282 are then threaded through the second support member 272 and into the bores 270 of the first support members 262 until the set screws 282 touch a seat 290 of the bores 270. The lock nuts 286 are then threaded onto the set screws 282 to prevent the belt 38 from falling off the first pulley 250 in case, for example, the drain cleaning machine 10 is dropped. In other embodiments, the set screws 282 are not used, and the second support members 274 are respectively coupled to the first support members 262 by the shoulder bolts 278.

Selection and Operation of the Translate Mechanism 26

When an operator desires to feed a snake into a drain, the operator first places the snake through the snake inlet tube 20 of the drain cleaning machine 10 until the snake protrudes from the snake outlet tube 18 and is arranged within the inlet of the drain. The operator then rotates the selection plate 82 to the translate position, as shown in FIGS. 5 and 6. Rotation of the selection plate 82 to the translate position also causes the outer and inner pin 86, 90, and thus the outer thrust assembly 94, the inner thrust assembly 98, the radial drive mechanism 30, and the translate mechanism 26 to all co-rotate with the selection plate 82 about the snake axis 22. The operator then pivots the actuating lever 42 from the deactivated position of FIG. 1 to the activated position of FIG. 2, causing the arms 50 to pivot and the linkage members 54 to pull the arms 58 of the push plate 62. The arms 58 translate within windows 294 of the frame 14, causing the push plate 62 to move toward the selection plate 82. The arms 58 within windows 294 also prevent the push plate 62 from rotating with respect to the inner frame 14 and snake inlet tube 20. Because the selection plate 82 is in the translate position, the inner pins 90 are aligned with the inner apertures 70 of the push plate 62 and the outer pins 86 are not aligned with the outer apertures 66, as shown in FIG. 5.

As the push plate 62 moves toward the selection plate 82, the inner pins 90 slip through the inner apertures 70 of the push plate 62, while the outer pins 86 are pushed by the push plate 62 toward the first race 102 of the outer thrust assembly 94, as shown in FIG. 6. Thus, the outer pins 86 push the outer thrust assembly 94, which in turn pushes the outer push rods 134 against the biasing force of springs 154 toward the push cone 150, as shown in FIG. 7. The push cone 150 is thus pushed by the outer push rods 134 toward the wheel collets 206. As the push cone 150 pushes against the wheel collets 206, the wheel collets 206 are translated within the rotating shell 146 towards the inner face 218 of the rotating shell 146. Once the second faces 214 of the wheel collets 206 engage against the inner face 218 of the rotating shell 146, the wheel collets 206 begin to move towards the snake axis 22. Specifically, the faces 210 of the wheel collets 206 slide along the inner face 202 of the push cone 150 and the second faces 214 of the wheel collets 206 slide along the inner face 218 of the rotating shell 146, causing adjacent wheel collets 206 to move toward each other against the biasing force of springs 238, and resulting in movement of the wheel collets 206 towards the snake axis 22, as shown in FIGS. 7 and 9. As the wheel collets 206 move toward snake axis 22, the wheels 242 move toward snake axis 22 until the wheels 242 engage the snake. In this position, the translate mechanism 26 is in an engaged state.

While still holding the actuating lever 42 in the selection position, the operator then actuates the motor 34 in the feed direction. The first pulley 250 transmits torque from the motor 34 to the second pulley 254, which causes the rotating shell 146 of the radial drive mechanism 30 to rotate. The rotating shell 146 thus rotates with the rotating shell 146 of the radial drive mechanism, causing the wheel collets 206 and wheels 242 to rotate about the snake axis 22. Because the wheel axes 246 are not parallel with the snake axis 22 and because the wheels 242 are engaged against the snake, rotation of the wheels 242 around the snake axis 22 causes the snake to move along the snake axis 22 through the drain cleaning machine 10 and into the drain. As discussed later herein, in some embodiments, movement of the actuating lever 42 to the activated position automatically starts the motor 34.

Selection and Operation of the Radial Drive Mechanism 30

Once the operator has fed a complete or sufficient length of the snake into the drain, the operator may wish to spin the snake in order to, for example, break up clogs within the drain. In order to spin the snake, the operator switches the translate mechanism 26 to a disengaged state and switches the radial drive mechanism 30 to an engaged state. Thus, the operator moves the actuating lever 42 back to the deactivated position shown in FIG. 1. Movement of the actuating lever 42 to the deactivated position translates the push plate 62 away from the selection plate 82, allowing the springs 154 to bias the outer push rods 134 away from the push cone 150, and pushing the outer thrust assembly 94 and the outer pins 86 away from the outer push rods 134. Because the push cone 150 is no longer pushed by the outer push rods 134 against the wheel collets 206, the wheel collets 206 are biased by the springs 238 away from each other and away from the snake axis 22, so the wheels 242 are no longer engaged against the snake and the translate mechanism is in a disengaged state. As discussed later herein, in some embodiments, movement of the actuating lever 42 to the deactivated position automatically stops the motor 34.

The operator then rotates the selection plate 82 to the radial drive position, as shown in FIGS. 4, 12, and 13. Rotation of the selection plate 82 to the radial drive position also causes the outer and inner pin 86, 90, and thus the outer thrust assembly 94, the inner thrust assembly 98, the radial drive mechanism 30, and the translate mechanism 26 to all co-rotate with the selection plate 82 about the snake axis 22. The operator then pivots the actuating lever 42 from the non-selection position of FIG. 1 to the activated position of FIG. 2, causing the arms 50 to pivot and the linkage members 54 to pull the arms 58 of the push plate 62. The arms 58 translate within the windows 294 of the frame 14, causing the push plate 62 to move toward the selection plate 82. Because the selection plate 82 is in the radial drive position, the inner pins 90 are not aligned with the inner apertures 70 of the push plate 62, and the outer pins 86 are aligned with the outer apertures 66, as shown in FIG. 12.

As the push plate 62 moves toward the selection plate 82, the outer pins 86 slip through the outer apertures 66 of the push plate 62 while the inner pins 90 are pushed by the push plate 62 toward the first race 114 of the inner thrust assembly 98, as shown in FIG. 13. Thus, the inner pins 90 push the inner thrust assembly 98, which in turn pushes the inner push rods 166 toward the collets 178, 180. The collets 178, 180 are respectively pushed by the inner push rods 166 toward the cross pins 186, as shown in FIGS. 14 and 15. As the collets 178, 180 push against the cross pins 186, the sloped faces 190 of the collets slide against the cross pins 186 while the collets 178, 180 move toward the snake axis 22 until the cross pins abut against the shoulders 192, at which point the collets 178, 180 are engaged against the snake such that the radial drive mechanism 30 is in an engaged state. As the collets 178, 180 rotate about the snake axis 22 while clamped on the snake, the snake spins about the snake axis 22 without moving along the snake axis 22.

In some embodiments, the inner push rod 166 that engages with the first collet 178 is omitted and the first collet 178 is radially locked or fixed in place, for instance, by a nut and a bolt. Thus, in these embodiments, only the second collet 180, the moveable collet, is moveable toward and away from the snake axis 22, when the radial drive mechanism 30 is alternatively switched between the engaged and disengaged states. In these embodiments, the clamping force exerted on the snake between the first and second collets 178, 180 is increased when the radial drive mechanism 30 is in the engaged state because the input force to clamp the snake is no longer divided between the first and second collets 178, 180. In some embodiments with the locked first collet 178, the clamping force exerted on the snake between the first and second collets 178, 180 is double or more that of the clamping force of the embodiment when the first collet 178 is moveable. In some embodiments with the locked first collet 178, the clamping force exerted on the snake between the first and second collets 178, 180 is 2.6 times the clamping force of the embodiments when the first collet 178 is moveable, because locking the first collet 178 reduces the friction between the snake and the first and second collets 178, 180. Specifically, all of the input force is transferred into the second collet 180 via the single inner push rod 166 engaging the second collet 180, which moves the second collet 180 toward the snake axis 22 and toward the first collet 178. In still other embodiments, the radial drive mechanism 30 can include more than two collets, with all the collets except one collet being locked in position, and the one collet being moveable toward and away from the snake axis 22 as the radial drive mechanism 30 is switched between the engaged and disengaged states to alternatively clamp and release the snake.

Retraction of the Snake from the Drain

Once the operator is satisfied with the operation of the radial drive mechanism 30 to spin the snake within the drain, the operator may wish to retract the snake from the drain. In order to retract the snake from the drain, the operator switches the radial drive mechanism 30 to the disengaged state and switches the translate mechanism 26 to the engaged state. The operator first turns off the motor 34 and moves the actuating lever 42 back to the deactivated position shown in FIG. 1. Movement of the actuating lever 42 to the deactivated position translates the push plate 62 away from the selection plate 82, allowing the springs 182 to pull the collets 178, 180 away from the snake axis 22, and pushing the inner push rods 166, the inner thrust assembly 98, and the inner pins 90 away from the collets 178, 180. Because the collets 178, 180 are moved away from the snake axis 22 and disengaged from the snake, the radial drive mechanism 30 is in a disengaged state.

The operator then switches the translate mechanism 26 to the engaged state, as described above. However, instead of actuating the motor 34 in a feed direction, the operator actuates the motor 34 in a retract direction, which is opposite of the feed direction. This causes the wheels 242 to rotate around the snake axis 22, but instead of feeding the snake into the drain, the wheels 242 cause the snake to move along the snake axis 22 through the drain cleaning machine 10 and retract out of the drain.

Manual Feeding and Retraction of the Snake while Engaging the Radial Drive Mechanism 30

In some instances, the operator may want to engage the radial drive mechanism 30 to spin the snake about the snake axis 22 while simultaneously feeding or retracting the snake from the drain. In these instances, the operator engages the radial drive mechanism 30 as described above, while the motor 34 is actuated. Then, the operator manually feeds the snake into or pulls the snake out of the snake inlet tube 20. As the snake is moved along the snake axis 22 into or out of the snake inlet tube 20, the snake is simultaneously spun about the snake axis 22 by the radial drive mechanism 30, thereby "drilling" the snake into or out a drain.

While the drain cleaning machine 10 is described above as including certain mechanical features that allow for its operation, in some embodiments, the drain cleaning machine 10 may include other mechanical features that allow for similar operations. Such alternative mechanical features include, but are not limited to, those that are described in the multiple embodiments of U.S. patent application Ser. No. 16/535,321, the entire contents of which are herein incorporated by reference.

Figure 18:
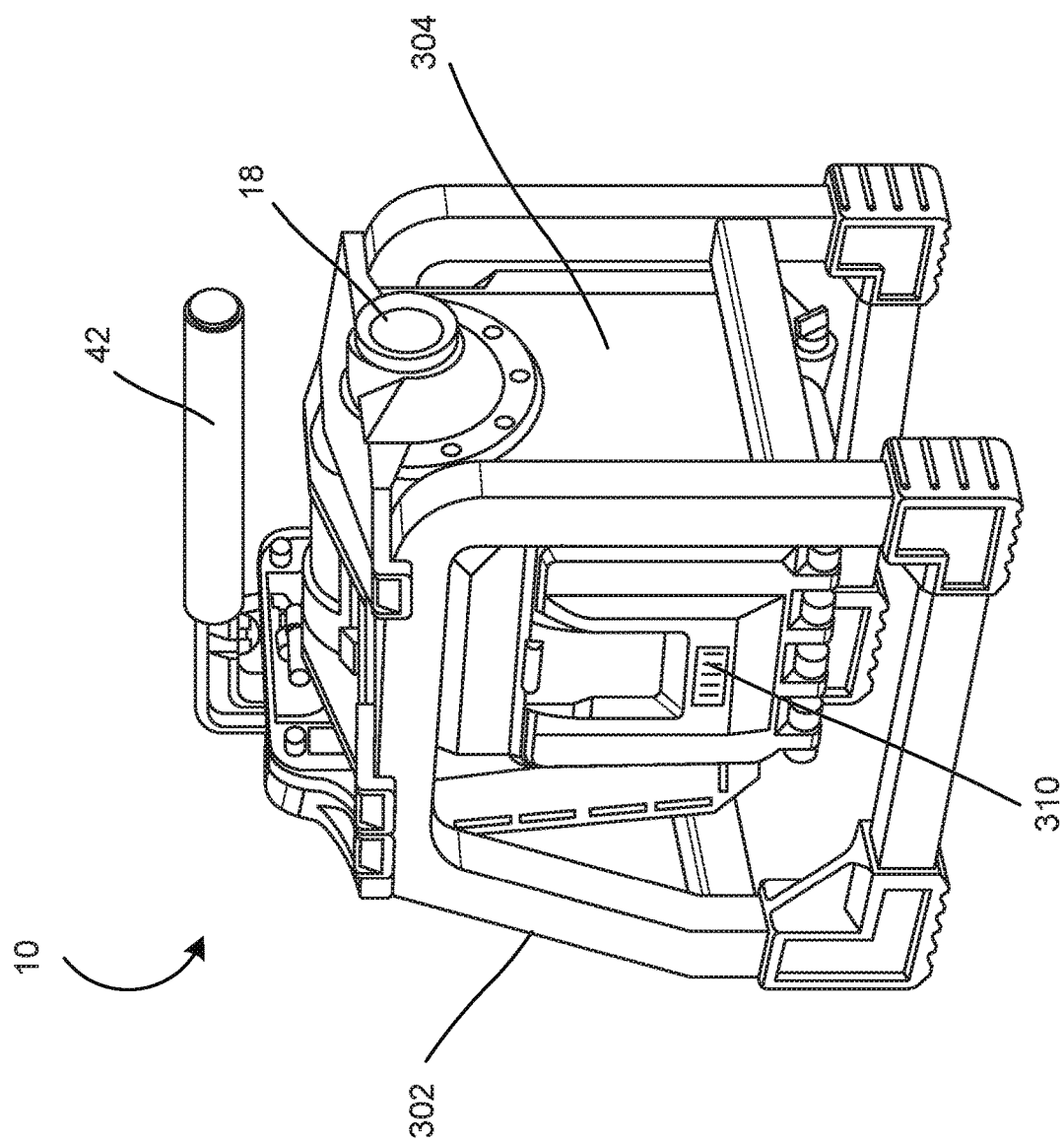
FIG. 18 is a perspective view of the drain cleaning machine of FIG. 1 including a housing and a frame configured to support the drain cleaning machine according to one example embodiment.

As shown in FIG. 18, the drain cleaning machine 10 may include a frame 302 and a housing 304. In some embodiments, the drain cleaning machine 10 includes a battery receptacle for receiving a battery (e.g., a power tool battery pack) to power the motor 34. The battery receptacle may be a battery compartment covered by a battery door 310 that seals and isolates the battery from the contaminated environment, thus keeping the battery clean and dry. In some embodiments, the drain cleaning machine 10 and the motor 34 may be configured to be optionally be powered by AC power instead of or in addition to the battery. In some embodiments, the drain cleaning machine 10 also includes a control panel (i.e., a user interface) located on the housing 304 or the frame 302. The control panel may include one or more input devices (e.g., buttons, dials, knobs, etc.) configured to set different operational parameters of the drain cleaning machine 10 (e.g., speed of the motor 34, output torque of the motor 34, direction of rotation of the motor 34, etc.) as explained in greater detail below. In some embodiments, the control panel may include a system on/off switch that controls whether power is supplied to the motor 34 when the actuating lever 42 (or a separate switch or actuator configured to have the same function as the actuating lever 42) is actuated. In other words, when the system on/off switch is off, power may not be supplied to the motor 34 when the actuating lever 42 (or a separate switch or actuator configured to have the same function as the actuating lever 42) is actuated. In some embodiments, when the system on/off switch is "off," power may not be provided to an electronic processor of the drain cleaning machine 10 or the electronic processor may be configured to enter a "sleep" mode. The control panel may also include one or more output devices (e.g., light emitting diodes (LEDs), sound indicators, etc.) configured to provide information to a user (e.g., to indicate when output torque of the motor 34 exceeds a predetermined threshold that is near a maximum output torque of the motor 34). In some embodiments, the control panel includes a touch screen that acts as both an input device and an output device. In some embodiments, the control panel is located on a side wall of the housing 304 or is mounted on the frame 302.

Figure 19:
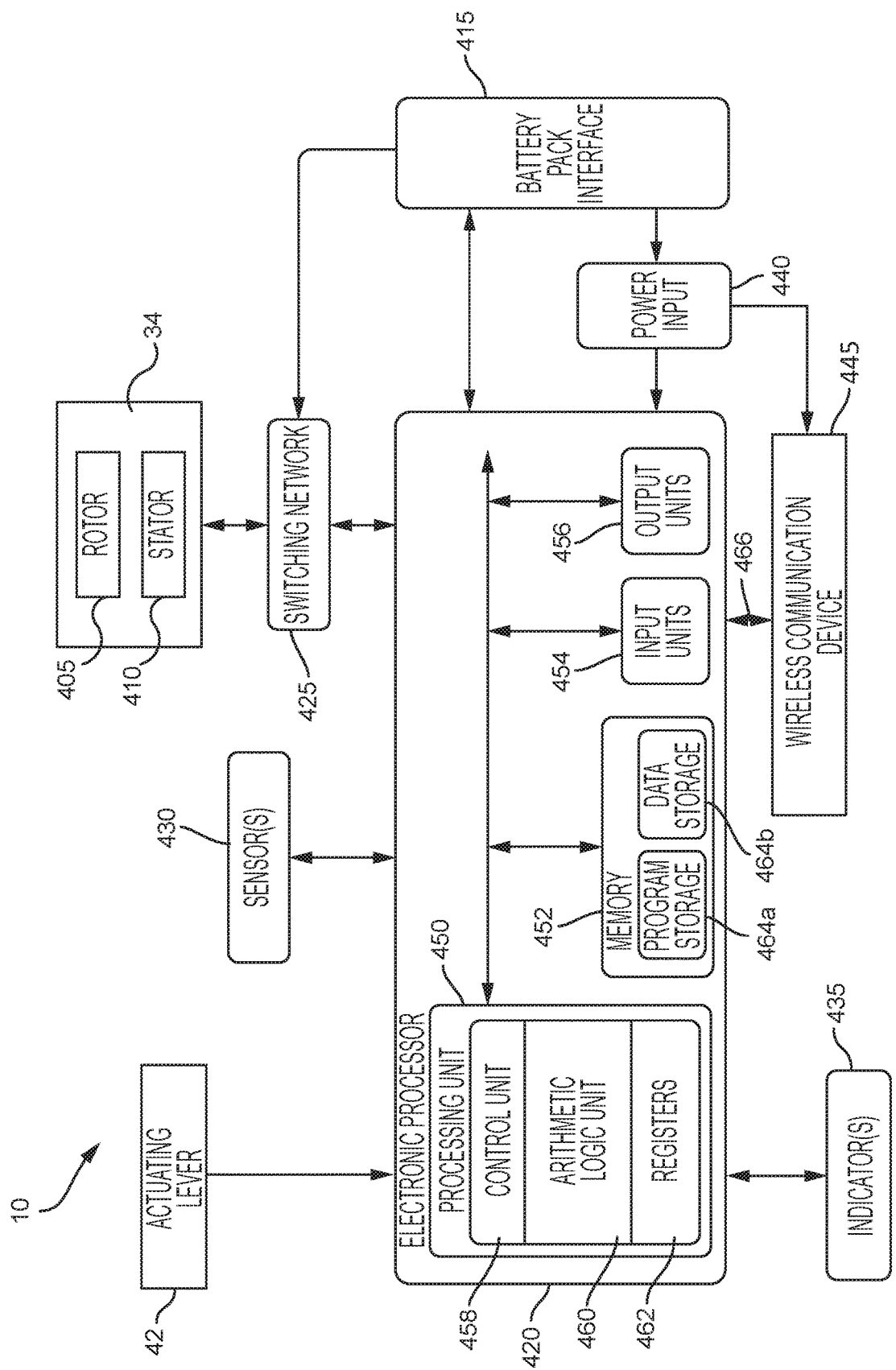
FIG. 19 is a block diagram of the drain cleaning machine of FIG. 1 according to one example embodiment.

FIG. 19 illustrates a block diagram of the drain cleaning machine 10 according to one example embodiment. As shown in FIG. 19, the drain cleaning machine 10 includes the motor 34 (e.g., a brushless DC motor) that includes a rotor 405 and a stator 410. The motor 34 rotates the feed and radial drive mechanisms 26, 30 about the snake axis 22 as described previously herein. A battery pack couples to the drain cleaning machine 10 via a battery pack interface 415 and provides electrical power to energize the motor 34. The actuating lever 42 (or a separate switch or actuator, such as a foot pedal, that includes the same functionality as the actuating lever 42) may be coupled to an electronic processor 420 via a switch or sensor to allow the electronic processor 420 to determine when the actuating lever 42 has been actuated.

As shown in FIG. 19, the drain cleaning machine 10 also includes a switching network 425, sensors 430, indicators 435 (i.e., the one or more output devices of the control panel described previously herein), a power input unit 440, and the electronic processor 420. The battery pack interface 415 includes a combination of mechanical (e.g., a battery pack receiving portion including battery support structure) and electrical components (e.g., terminals) configured to and operable for interfacing (e.g., mechanically, electrically, and communicatively connecting) the drain cleaning machine 10 with a battery pack (e.g., a power tool battery pack). The battery pack interface 415 transmits the power received from the battery pack to the power input unit 440. The power input unit 440 includes combinations of active and passive components (e.g., voltage step-down controllers, voltage converters, rectifiers, filters, etc.) to regulate or control the power received through the battery pack interface 415 and provided to the electronic processor 420 and a wireless communication device 445 that may be included in the drain cleaning machine 10.

The switching network 425 enables the electronic processor 420 to control the operation of the motor 34. Generally, when the drain cleaning machine 10 is operated, electrical current is supplied from the battery pack interface 415 to the motor 34 via the switching network 425. The switching network 425 controls the amount of current available to the motor 34 and thereby controls the speed and torque output of the motor 34. The switching network 425 may include several field effect transistors (FETs), bipolar transistors, or other types of electrical switches, such as six FETs in a bridge arrangement. The electronic processor 420, in some embodiments, drives successive switching elements of the switching network 425 with respective pulse width modulation (PWM) signals to alternately drive stator coils of the stator 410, thus inducing rotation of the rotor 405. The sensors 430 are coupled to the electronic processor 420 and communicate to the electronic processor 420 various signals indicative of different parameters of the drain cleaning machine 10 and/or the motor 34. The sensors 430 include, for example, one or more current sensors, one or more voltage sensors, one or more temperature sensors, one or more speed sensors, one or more motor position sensors (e.g., Hall Effect sensors), etc.

For example, the speed of the motor 34 can be determined using a plurality of Hall Effect sensors to sense the rotational position and/or speed of the motor 34. In some embodiments, the electronic processor 420 controls the switching network 425 in response to signals received from the sensors 430. For example, if the electronic processor 420 determines that the speed of the motor 34 is increasing too rapidly based on information received from the sensors 430, the electronic processor 420 may adapt or modify the active switches or switching sequence within the switching network 425 to reduce the speed of the motor 34. As another example, the electronic processor 420 may be configured to monitor a load/output torque of the motor 34 (e.g., by monitoring current drawn by the motor 34 as sensed by a current sensor). The electronic processor 420 may be configured to determine that the load/output torque is greater than a predetermined threshold and, in response thereto, control an output device (i.e., an indicator 435) to provide an indication that the load/output torque is greater than the predetermined threshold. As yet another example, the electronic processor 420 may be configured to monitor the current provided to the motor 34 (via a current sensor) and an amount of time during which the current is provided to the motor 34. The electronic processor 420 may be further configured to determine that the motor 34 is at risk of overheating based on the current and the amount of time during which the current is provided to the motor 34 and, in response thereto, control the power switching elements 425 to cease driving the motor 34. In some embodiments, data obtained via the sensors 430 may be saved in the electronic processor 420 as tool usage data.

Although the drain cleaning machine 10 is described above as including motor positional sensors (e.g., Hall Effect sensors), in some embodiments, the drain cleaning machine 10 may not include Hall sensor(s) to monitor rotational position and/or speed information of the motor 34. Rather, the drain cleaning machine 10 may implement a sensor-less design to monitor rotational position and/or speed of the motor 34, for example, by monitoring back electromotive force (EMF) of the motor 34 or by using high frequency signal injection.

The indicators 435 are also coupled to the electronic processor 420 and receive control signals from the electronic processor 420 to turn on and off or otherwise convey information based on different states of the drain cleaning machine 10. The indicators 435 (i.e., output devices) include, for example, one or more light-emitting diodes ("LED"), a display screen, one or more sound indicators such as speakers or buzzers, tactile indicators, and/or the like. The indicators 435 can be configured to display conditions of, or information associated with, the drain cleaning machine 10 as explained previously herein. For example, the indicators 435 are configured to indicate measured electrical characteristics of the drain cleaning machine 10, the status of the drain cleaning machine 10, etc.

As described above, the electronic processor 420 is electrically and/or communicatively connected to a variety of components of the drain cleaning machine 10. In some embodiments, the electronic processor 420 includes a plurality of electrical and electronic components that provide power, operational control, and protection to the components within the electronic processor 420 and/or the drain cleaning machine 10. For example, the electronic processor 420 includes, among other things, a processing unit 450 (e.g., a microprocessor, a microcontroller, or another suitable programmable device), a memory 452, input units 454, and output units 456. The processing unit 450 includes, among other things, a control unit 458, an arithmetic logic unit ("ALU") 460, and a plurality of registers 462 (shown as a group of registers in FIG. 19). In some embodiments, the electronic processor 420 is implemented partially or entirely on a semiconductor (e.g., a field-programmable gate array ["FPGA"] semiconductor) chip, such as a chip developed through a register transfer level ("RTL") design process.

The memory 452 includes, for example, a program storage area 464a and a data storage area 464b. The program storage area 464a and the data storage area 464b can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 450 is connected to the memory 452 and executes software instructions that are capable of being stored in a RAM of the memory 452 (e.g., during execution), a ROM of the memory 452 (e.g., on a generally permanent basis), or another non-transitory computer readable medium such as another memory or a disc. Software included in the implementation of drain cleaning machine 10 can be stored in the memory 452 of the electronic processor 420. The software includes, for example, firmware, one or more applications, program data, filters, rules, and other executable instructions. The electronic processor 420 is configured to retrieve from memory and execute, among other things, instructions related to the control processes and methods described herein. The electronic processor 420 is also configured to store power tool information on the memory 452. The power tool information stored on the memory 452 may include power tool identification information (e.g., including a unique identifier of the drain cleaning machine 10) and also power tool operational information including information regarding the usage of the drain cleaning machine 10, information regarding the maintenance of the drain cleaning machine 10, parameter information to operate the drain cleaning machine 10 in a particular mode (e.g., look-up tables that include speed and or output torque information for different drain cleaning applications), and other information relevant to operating or maintaining the drain cleaning machine 10. In other constructions, the electronic processor 420 includes additional, fewer, or different components.

The electronic processor 420 also includes a data connection (e.g., a communication channel) 466 to couple to the optional wireless communication device 445. In some embodiments, the data connection 466 includes one or more wires (and/or a ribbon cable) that are connected from the electronic processor 420 to the wireless communication device 445.

Figure 20:
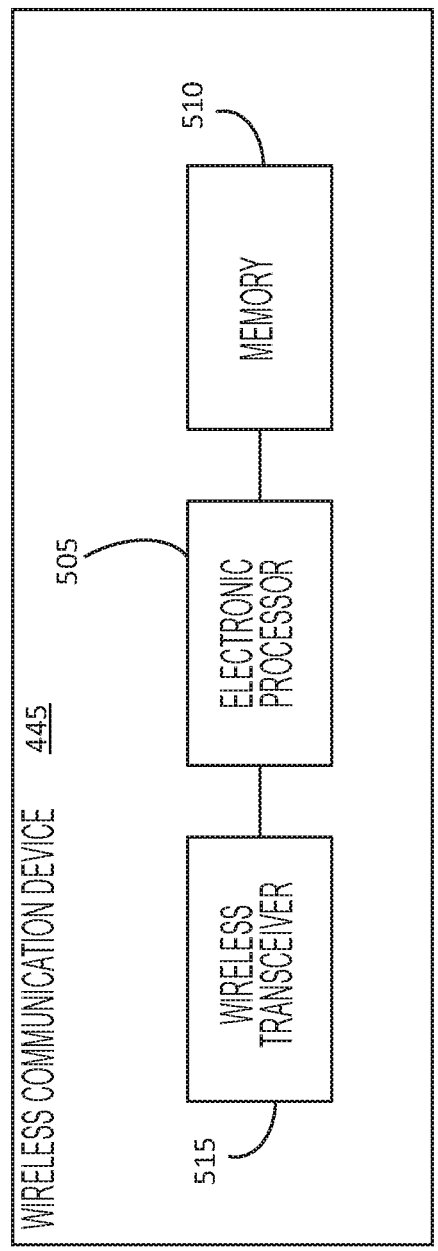
FIG. 20 is a block diagram of a wireless communication device of the drain cleaning machine of FIG. 1 according to one example embodiment.

FIG. 20 illustrates a block diagram of the wireless communication device 445 according to one example embodiment. The wireless communication device 445 enables the electronic processor 420 of the drain cleaning machine 10 to wirelessly communicate with an external device 605 (see FIG. 21). For example, the electronic processor 420 may wirelessly communicate with the external device 605 via the wireless communication device 445 to transmit power tool data (e.g., usage data, configuration data, maintenance data, and the like) and to receive power tool configuration data (e.g., settings/operational parameters for operating the drain cleaning machine 10 in a particular mode or for a particular application and the like). As shown in FIG. 20, the wireless communication device 445 includes an electronic processor 505, a memory 510, and a wireless transceiver 515. The electronic processor 505 and the memory 510 may be similar to like-named components described above with respect to the drain cleaning machine 10. The wireless transceiver 515 may include an antenna that is configured to operate with the wireless transceiver 515 to send and receive wireless messages to and from the external device 605 and the electronic processor 505. The memory 510 can store instructions to be implemented by the electronic processor 505 and/or may store data related to communications between the drain cleaning machine 10 and the external device 605 or the like. The electronic processor 505 of the wireless communication device 445 controls wireless communications between the drain cleaning machine 10 and the external device 605. For example, the electronic processor 505 buffers incoming and/or outgoing data, communicates with the electronic processor 420 of the drain cleaning machine 10, and determines the communication protocol and/or settings to use in wireless communications. In other words, the wireless communication device 445 is configured to receive data from the electronic processor 420 of the drain cleaning machine 10 and relay the data to the external device 605 via the wireless transceiver 515. In a similar manner, the wireless communication device 445 is configured to receive information (e.g., configuration and programming information) from the external device 605 via the wireless transceiver 515 and relay the information to the electronic processor 420 of the drain cleaning machine 10.

In the illustrated embodiment, the wireless communication device 445 is a Bluetooth® controller. The Bluetooth® controller communicates with the external device 605 employing the Bluetooth® protocol. Therefore, in the illustrated embodiment, the external device 605 and the drain cleaning machine 10 are within a communication range (i.e., in proximity) of each other while they exchange data. In other embodiments, the wireless communication device 445 communicates using other protocols (e.g., Wi-Fi, cellular protocols, etc.) over a different type of wireless network. For example, the wireless communication device 445 may be configured to communicate via Wi-Fi through a wide area network such as the Internet or a local area network, or to communicate through a piconet (e.g., using infrared or NFC communications). As another example, the wireless communication device 445 may be configured to communicate over a cellular network. The communication via the wireless communication device 445 may be encrypted to protect the data exchanged between the drain cleaning machine 10 and the external device 605 (or network) from third parties. In some embodiments, the wireless communication device 445 includes a multi-band/multi-protocol antenna. In other words, a single antenna may be used for multiple transceivers that use different communication protocols (e.g., Bluetooth®, Wi-Fi, GPS, cellular, etc.). In such embodiments, each transceiver may selectively connect to the antenna via a respective switch, power divider, or frequency dependent impedance network.

In some embodiments, the drain cleaning machine 10 shown in FIG. 19 and/or the wireless communication device 445 shown in FIG. 20 include more or fewer components than those shown in FIGS. 19 and 20. For example, the wireless communication device 445 may include an accelerometer, a gyroscope, and/or subscriber identity module (SIM) card. As another example, the wireless communication device 445 may include a backup power source (e.g., a coin cell battery, another type of battery cell, a capacitor, or another energy storage device), a real-time clock (RTC), and/or an indicator light. As yet another example, the drain cleaning machine 10 may not include the wireless communication device 445 and may instead be controlled solely via the control panel described previously herein.

Figure 21:
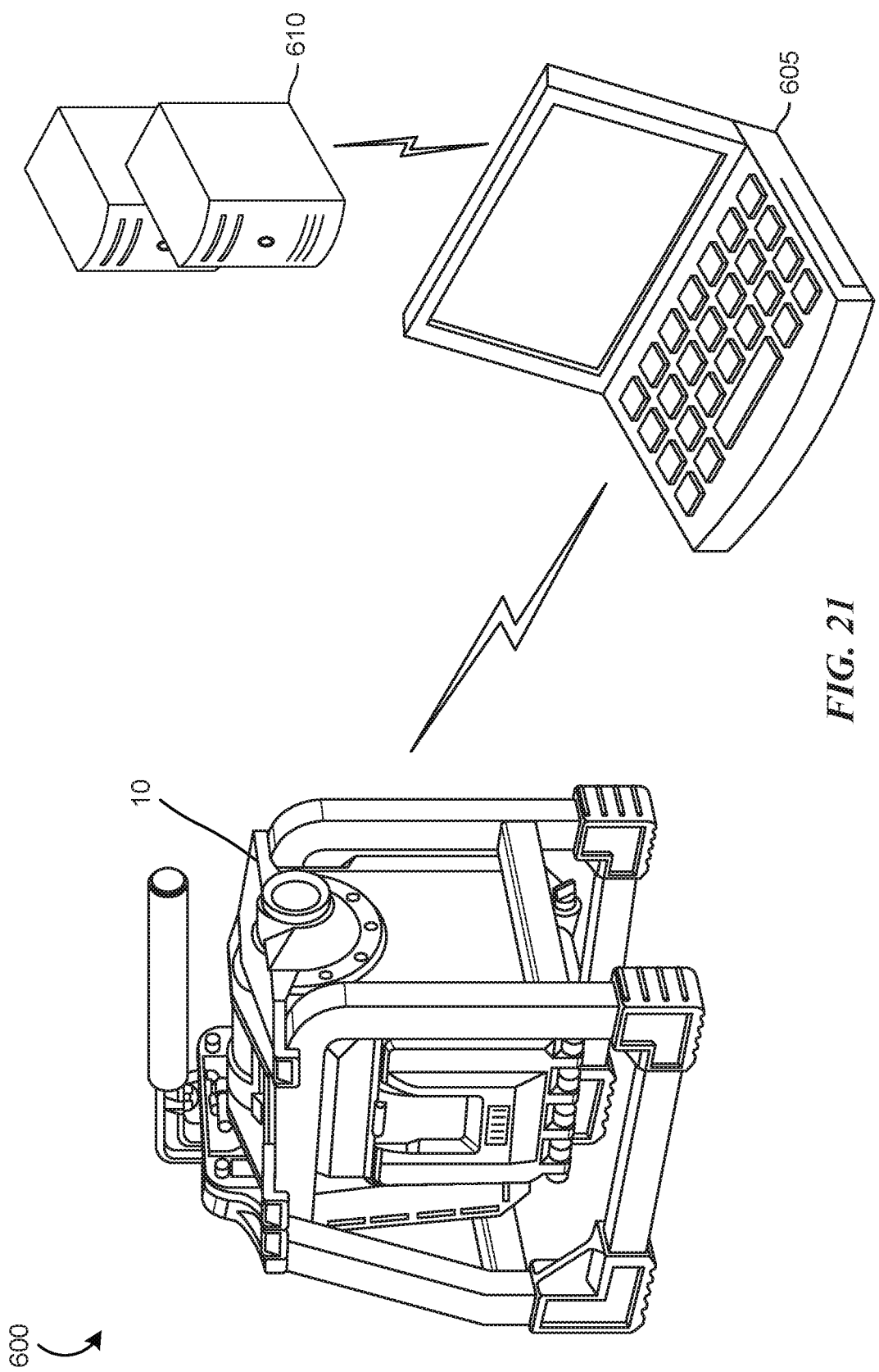
FIG. 21 illustrates a communication system including the drain cleaning machine of FIG. 18 according to one example embodiment.

FIG. 21 illustrates a communication system 600 that includes the drain cleaning machine 10 and the external device 605 that may wirelessly communicate with each other according to some embodiments as described previously herein. The external device 605 may also communicate with a remote server 610 and may receive configuration and/or settings for the drain cleaning machine 10, or may transmit operational data or other power tool status information to the remote server 610. In some embodiments, the external device 605 may communicate with the drain cleaning machine 10 and/or the remote server 610 via a wired connection.

The external device 605 may be, for example, a laptop computer, a tablet computer, a smartphone, a cellphone, or another electronic device capable of communicating wirelessly with the drain cleaning machine 10 and providing a user interface. The external device 605 provides the user interface and allows a user to access and interact with tool information. The external device 605 can receive user inputs to determine operational parameters/settings, enable or disable features, and the like. The user interface of the external device 605 provides an easy-to-use interface for the user to control and customize operation of the drain cleaning machine 10 (see FIGS. 28 and 29) and can be used in combination with or in place of a control panel located on the frame 302 or the housing 304 of the drain cleaning machine 10.

Figure 22:
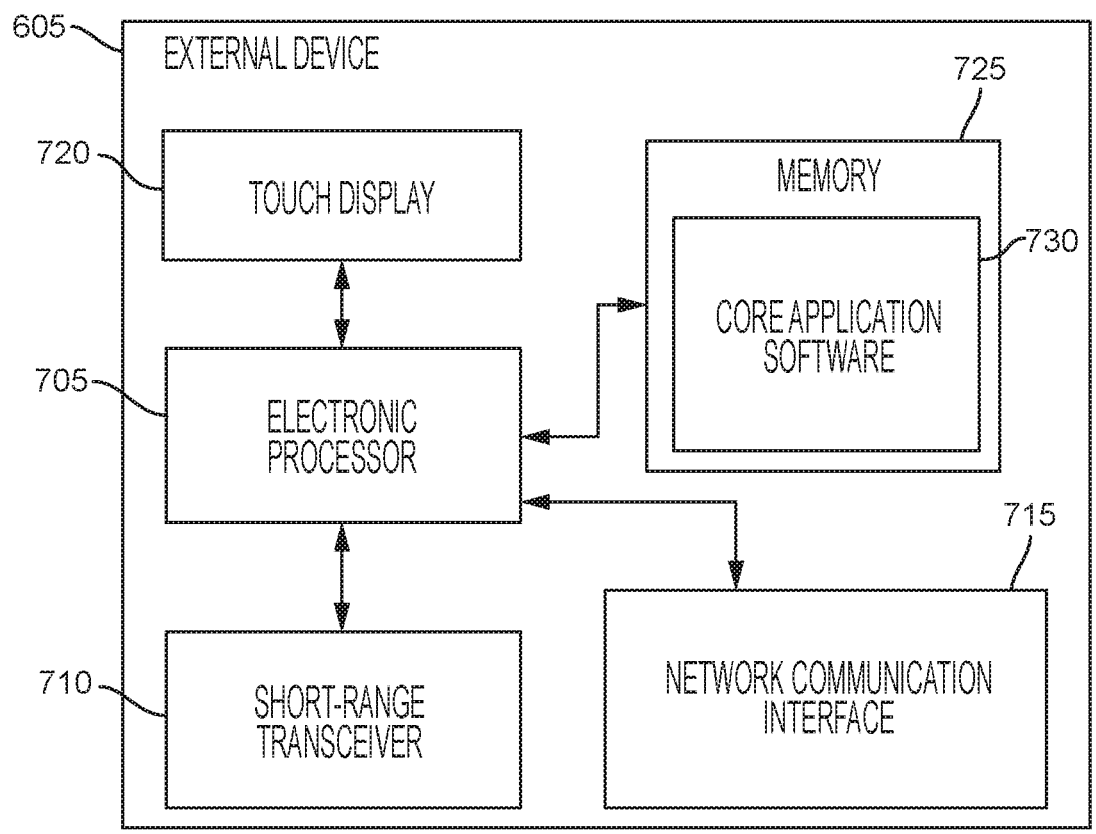
FIG. 22 is a block diagram of an external device of the communication system of FIG. 21 according to one example embodiment.

As shown in FIG. 22, the external device 605 includes an electronic processor 705, a short-range transceiver 710, a network communication interface 715, a touch display 720, and a memory 725. The external device electronic processor 705 is coupled to the short-range transceiver 710, the network communication interface 715, the touch display 720, and the memory 725. The short-range transceiver 710, which may include or is coupled to an antenna (not shown), is configured to communicate with the wireless transceiver 515 of the drain cleaning machine 10. The short-range transceiver 710 can also communicate with other electronic devices. The network communication interface 715 communicates with a network to enable communication with the remote server 610. In some embodiments, the network may be an Internet network, a cellular network, another network, or a combination thereof.

The memory 725 of the external device 605 also stores core application software 730. The electronic processor 705 accesses and executes the core application software 730 in the memory 725 to launch a control application that receives inputs from the user for the configuration and operation of the drain cleaning machine 10. The short-range transceiver 710 of the external device 605 is compatible with the wireless transceiver 515 of the drain cleaning machine 10 and may include, for example, a Bluetooth® communication controller. The short-range transceiver 710 allows the external device 605 to communicate with the drain cleaning machine 10.

The remote server 610 may store data obtained by the external device 605 from, for example, the drain cleaning machine 10. The remote server 610 may also provide additional functionality and services to the user. In one embodiment, storing the information on the remote server 610 allows a user to access the information from a plurality of different devices and locations (e.g., a remotely located desktop computer). In another embodiment, the remote server 610 may collect information from various users regarding their power tool devices and provide statistics or statistical measures to the user based on information obtained from the different power tools. For example, the remote server 610 may provide statistics regarding the experienced efficiency of the drain cleaning machine 10, typical usage of the drain cleaning machine 10, and other relevant characteristics and/or measures of the drain cleaning machine 10. In some embodiments, the drain cleaning machine 10 may be configured to communicate directly with the server 610 through an additional wireless interface or with the same wireless interface that the drain cleaning machine 10 uses to communicate with the external device 605.

Turning to the motor functionality of the drain cleaning machine 10, contrary to current drain cleaning machines that include AC induction motors with merely an on/off switch and without variable speed control, in some embodiments, the motor 34 of the drain cleaning machine 10 is a brushless DC motor. Using a brushless DC motor in the drain cleaning machine 10 provides a number of advantages over using AC induction motors that do not include variable speed control. For example, unlike an AC induction motor, the speed of the brushless DC motor 34 may be easily varied such that the snake can be radially rotated/spun at different speeds depending on different applications (e.g., different clogs, different types of cable being used as the snake, different accessories attached to the snake, etc.). Also unlike an AC induction motor, the output torque of the brushless DC motor 34 may be easily varied by providing more or less current to the brushless DC motor 34 by adjusting a pulse width modulation (PWM) signal that controls the power switching elements 425 that control whether current is provided to the brushless DC motor 34. Accordingly, the snake can be radially rotated/spun at different output torques depending on different applications (e.g., clogs of different size pipes, different distances in which the snake is to be inserted into a pipe, different types of cable being used as the snake, different accessories attached to the snake, etc.)

However, while brushless DC motors have at least the above-noted advantages over AC induction motors, the typical speed-torque curve of an AC induction motor is different than the typical speed-torque curve of a brushless DC motor. In particular, while AC induction motors used in drain cleaning machines typically maintain relatively constant speed under variable loads (see FIG. 23), a speed of a brushless DC motor tends to slow down proportionately as the load experienced by the brushless DC motor increases (see FIG. 24). The slowing down of a brushless DC motor as the load increases may give the user the perception that the brushless DC motor is overloaded and that a drain cleaning machine using the brushless DC motor is not strong enough to complete a drain cleaning task. Thus, there is a technological problem with drain cleaning machines. Accordingly, one of the goals of this application is to address this technological problem by controlling the brushless DC motor 34 to function similarly to an AC induction motor in some situations. For example, the electronic processor 420 of the drain cleaning machine 10 may control the power switching elements 425 to cause a rotational speed under a variable load of the brushless DC motor 34 to behave approximately the same as that of an alternating current (AC) induction motor of approximately the same size as the brushless DC motor 34 by implementing speed clipping in an operating range when a load experienced by the brushless DC motor 34 is less than or equal to a predetermined load.

Figure 23:
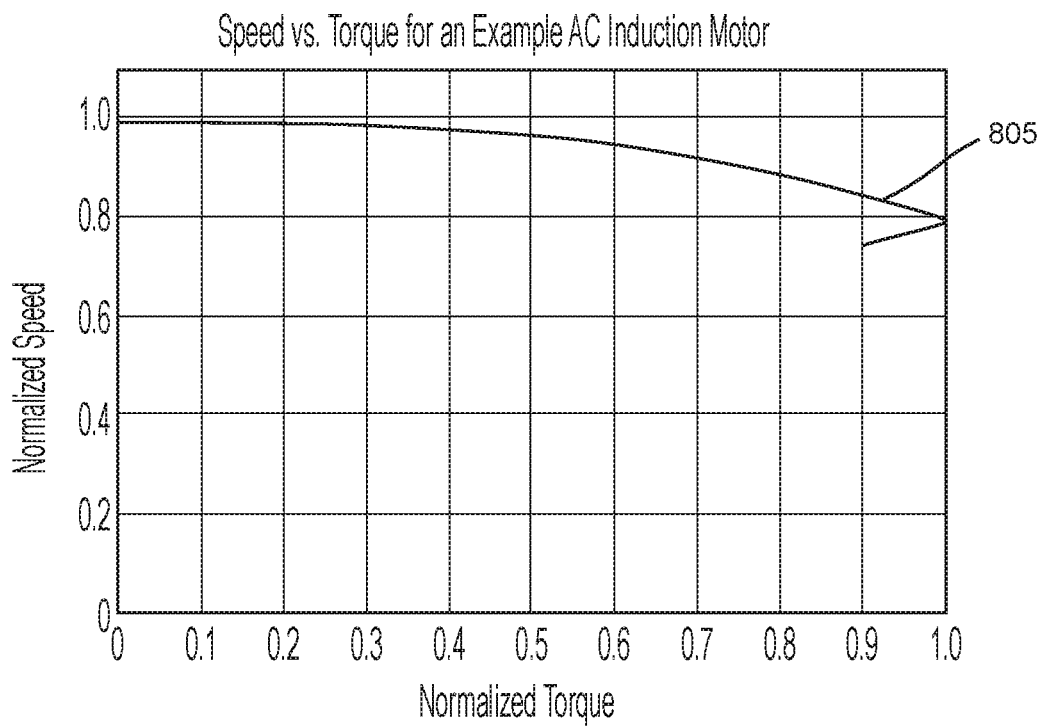
FIG. 23 illustrates a graph of a speed versus torque curve for an example alternating current (AC) induction motor.

FIG. 23 illustrates a graph of a speed versus torque curve 805 for an example AC induction motor. In FIG. 23, speed is normalized such that a synchronous speed of the example AC induction motor is represented by 1.0 on the vertical axis, and torque is normalized such that a stall torque of the example AC induction motor is represented by 1.0 on the horizontal axis. As indicated by the curve 805 in FIG. 23, for much of the operating range of the example AC induction motor, a speed of the motor is approximately equal to the synchronous speed (i.e., minimal slip) of the example AC induction motor. For example, the speed of the example AC induction motor does not decrease below 90% of the synchronous speed until the load of the example AC induction motor has increased such that the torque of the example AC induction motor has reached approximately 75% of the stall torque. In other words, the example AC induction motor maintains relatively constant speed under variable loads within most of its operating range.

Figure 24:
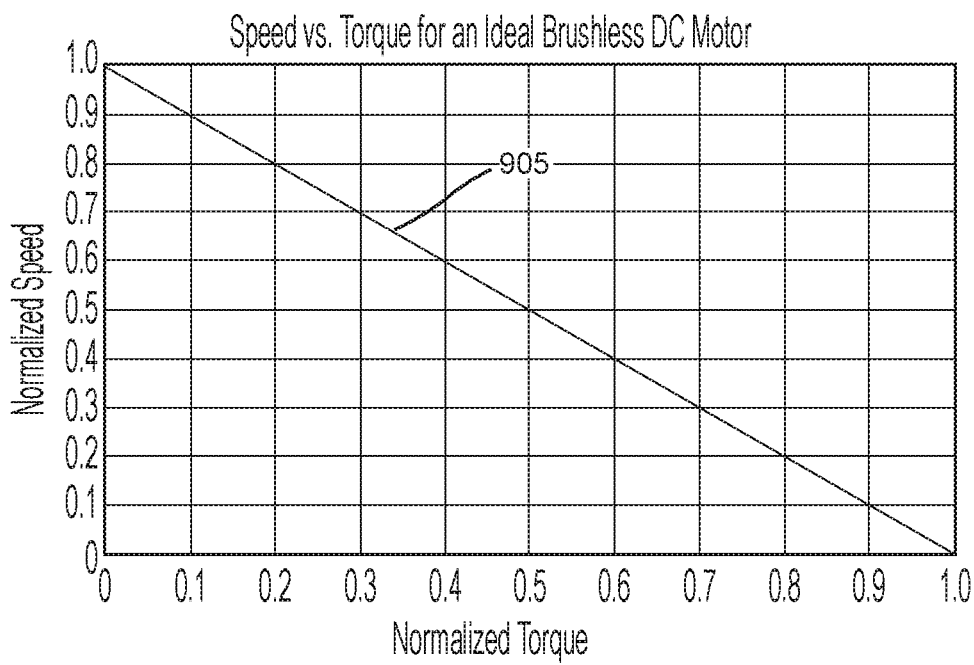
FIG. 24 illustrates a graph of a speed versus torque curve for an ideal brushless direct current (DC) motor.

On the other hand, FIG. 24 illustrates a graph of a speed versus torque curve 905 for an ideal brushless DC motor. Similar to FIG. 23, in FIG. 24, speed is normalized such that a base, no-load speed of the ideal brushless DC motor is represented by 1.0 on the vertical axis, and torque is normalized such that a stall torque of the ideal brushless DC motor is represented by 1.0 on the horizontal axis. As indicated by the curve 905 in FIG. 24, a speed of the ideal brushless DC motor is inversely proportional to a torque of the ideal brushless DC motor. In other words, as a load experienced by the ideal brushless DC motor increases and increases the torque of the motor, the speed of the motor proportionately decreases. Thus, unlike the example AC induction motor described above, a speed of the ideal brushless DC motor does not remain approximately constant under variable loads within most of its operating range.

Figure 25:
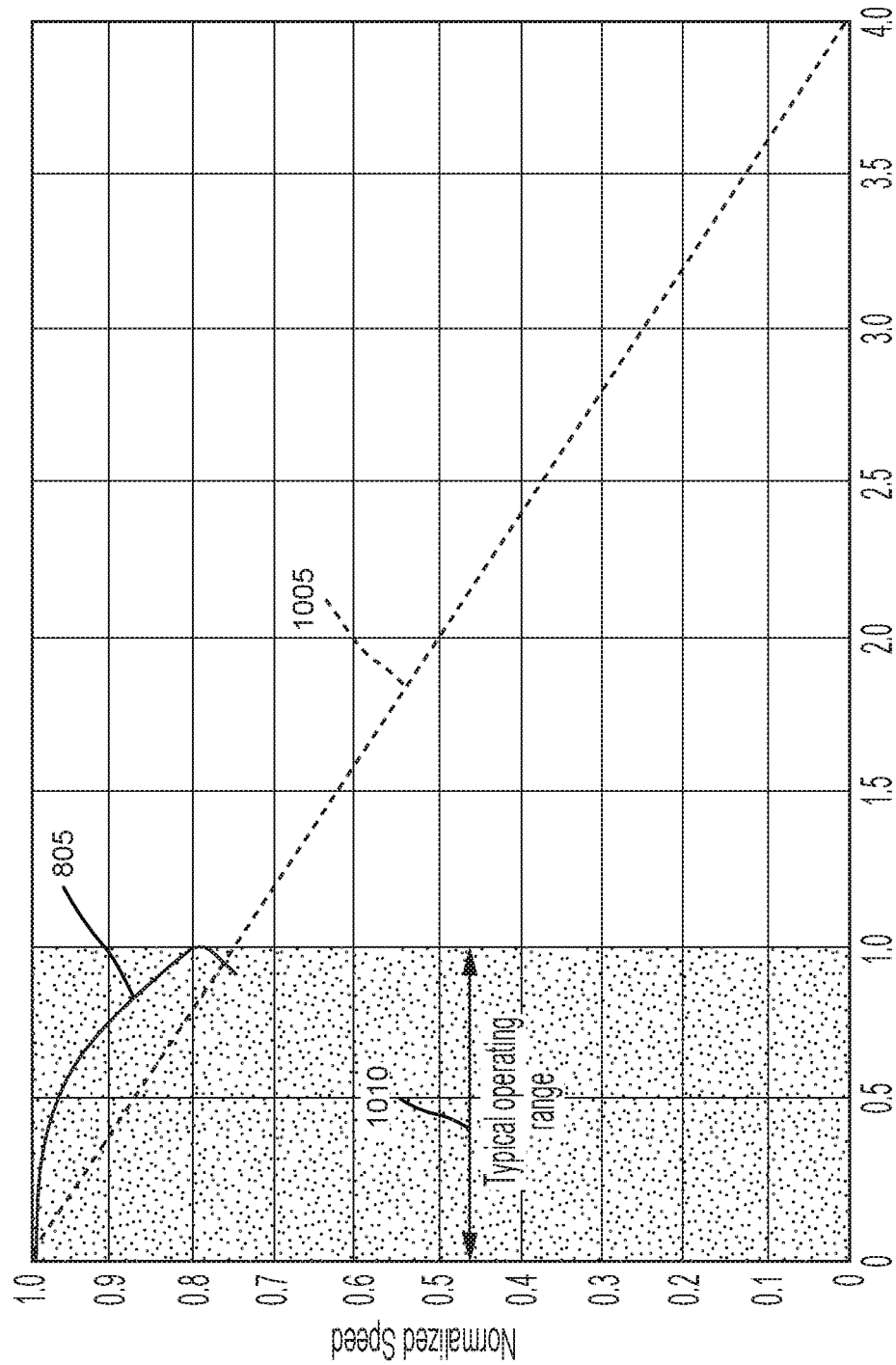
FIG. 25 illustrates a graph of the speed versus torque curve of FIG. 23 for the example AC induction motor compared to a speed versus torque curve of an ideal brushless DC motor that is comparable in size to the example AC induction motor.

FIG. 25 illustrates a graph of the speed versus torque curve 805 for the example AC induction motor compared to a speed versus torque curve 1005 of an ideal brushless DC motor that is comparable in size to the example AC induction motor. Similar to FIG. 23, in FIG. 25, speed is normalized such that a synchronous speed of the example AC induction motor and a base, no-load speed of the ideal brushless DC motor are represented by 1.0 on the vertical axis. As indicated by the graph of FIG. 25, the synchronous speed and the base, no load speed are approximately equal. In FIG. 25, torque is normalized such that a stall torque of the example AC induction motor is represented by 1.0 on the horizontal axis. As indicated by the graph of FIG. 25, the stall torque of the ideal brushless DC motor is approximately four times that of the AC induction motor and is represented by 4.0 on the horizontal axis. However, both motors have a typical operating range 1010 between up to a normalized speed of approximately 1.0 and a normalized torque of approximately 1.0 as indicated by the graph of FIG. 25. As illustrated by the curves 805 and 1005 in FIG. 25, within the typical operating range 1010, the AC induction motor maintains a speed closer to a normalized speed of 1.0 than the ideal brushless DC motor. As explained previously herein, this difference between the operation of the brushless DC motor and the AC induction motor (i.e., the slowing down of a brushless DC motor as the load increases) may give the user the perception that the brushless DC motor is overloaded and that a drain cleaning machine 10 using the brushless DC motor is not strong enough to complete a drain cleaning task.

Figure 26:
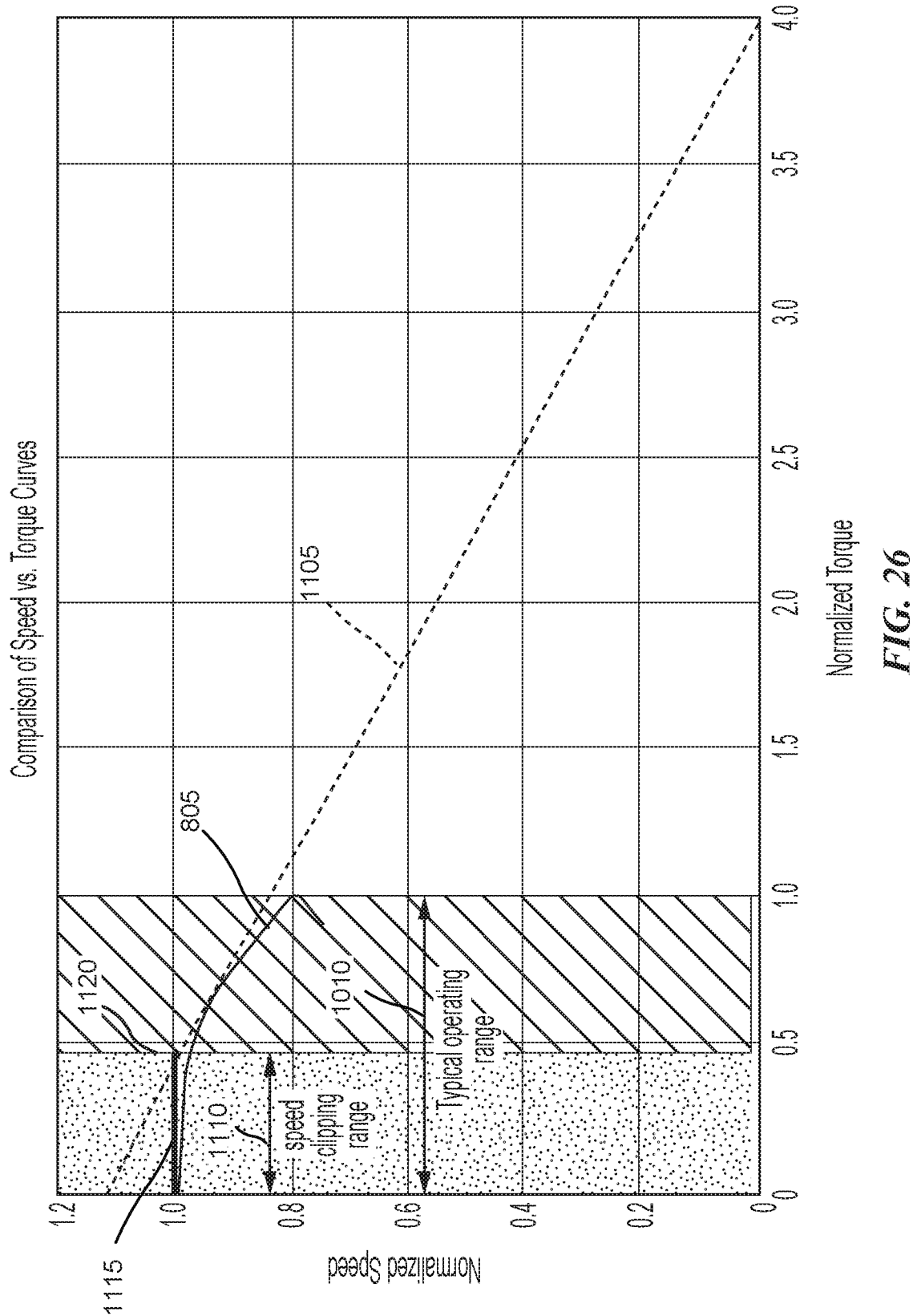
FIG. 26 illustrates a graph of the speed versus torque curve of FIG. 23 for the example AC induction motor compared to a speed versus torque curve of a speed-clipped ideal brushless DC motor that is comparable in size to the example AC induction motor and that is designed for slight overspeed.

However, designing the brushless DC motor for slight overspeed and electronically limiting the speed of (i.e., speed clipping) the brushless DC motor causes the brushless DC motor to function similarly to an AC induction motor in the typical operating range 1010. As indicated by the speed versus torque curve 1105 in FIG. 26, the brushless DC motor is designed for slight overspeed at a base, no-load speed (e.g., a normalized base, no-load speed of approximately 1.1). The speed versus torque curve 1105 is otherwise similar to the speed versus torque curve 1005 of FIG. 25. In a speed clipping range 1110 where the speed of the AC induction motor is approximately constant regardless of torque, the electronic processor 420 may be configured to electronically clip the speed of the brushless DC motor to maintain the speed at a normalized speed of 1.0 (see speed-clipped portion 1115 of the curve 1105 in FIG. 26). For example, the electronic processor 420 may control a PWM signal provided to the power switching elements 425 to reduce the amount of current provided to the motor 34 such that the motor 34 rotates at less than its maximum speed when the torque/load of the brushless DC motor 34 (as determined by monitoring current drawn by the brushless DC motor 34) is less than or equal to a predetermined torque/load 1120 (i.e., a rated load). Accordingly, a speed versus torque curve 1105 of the brushless DC motor will approximately match the speed versus torque curve 805 of the AC induction motor as shown in the graph of FIG. 26. In fact, as shown in FIG. 26, speed performance of the brushless DC motor is equal to or better than that of the AC induction motor through the entire typical operating range 1010 of the motors.

By electronically implementing speed clipping to produce the speed versus torque curve 1105 for the brushless DC motor 34, the electronic processor 420 causes the motor 34 to provide constant speed from no load up until a predetermined load/torque at which point the speed of the motor 34 begins to decrease. Such a design causes the brushless DC motor 34 to behave similarly to an AC induction motor during an operating range of various loads/torques and thus addresses the technical problem of the user perceiving bog down of the brushless DC motor described previously herein.

Figure 27:
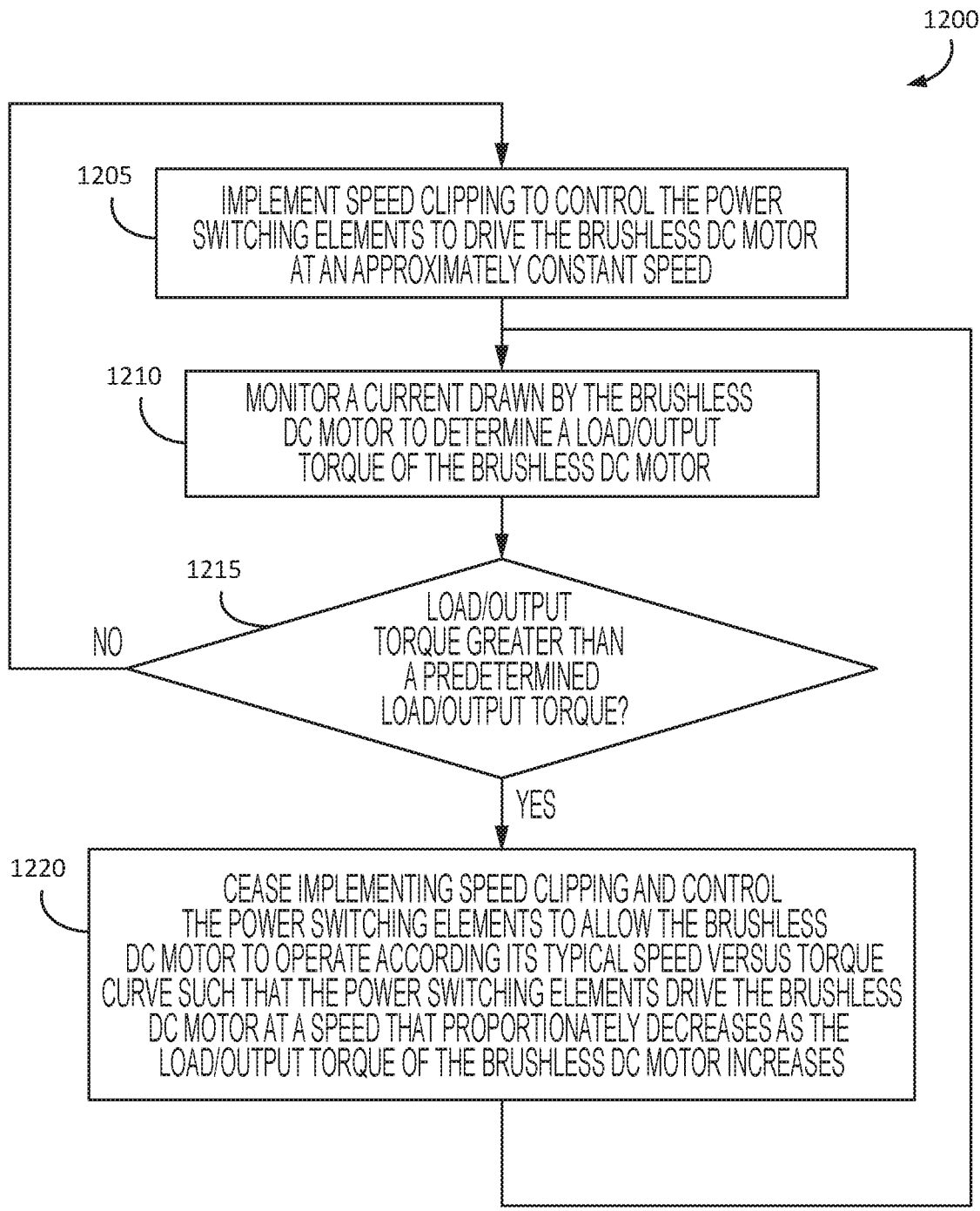
FIG. 27 is a flowchart of a method implemented by an electronic processor of the drain cleaning machine of FIG. 1 to electronically control a speed of a brushless DC motor using speed clipping according to one example embodiment.

FIG. 27 is a flowchart of a method 1200 implemented by the electronic processor 420 to electronically control a speed of the brushless DC motor 34 using speed clipping to produce the speed versus torque curve 1105 of FIG. 26. In response to receiving a signal indicating that the motor 34 should be turned on (e.g., from the actuating lever 42), at block 1205, the electronic processor 420 implements speed clipping to control the power switching elements 425 to drive the brushless DC motor 34 at an approximately constant speed. During operation of the motor 34, at block 1210, the electronic processor 420 monitors a current drawn by the brushless DC motor 34 to determine a load/output torque of the brushless DC motor 34. At block 1215, electronic processor 420 determines whether the load/output torque is greater than a predetermined load/output torque (i.e., a rated load). In response to determining that the load/output torque is not greater than the predetermined load/output torque, the method 1200 proceeds back to block 1205 and the electronic processor 420 continues to implement speed clipping. On the other hand, when the load/output torque is greater than the predetermined load/output torque, at block 1220, the electronic processor 420 ceases implementing speed clipping and controls the power switching elements 425 to allow the brushless DC motor 34 to operate according to its typical speed versus torque curve (see curve 1005 in FIG. 25 or the portion of curve 1105 in FIG. 26 that is located outside of the speed clipping range 1110). In other words, the electronic processor 420 controls the power switching elements 425 to drive the brushless DC motor 34 at a speed that proportionately decreases as the load/output torque of the brushless DC motor 34 increases.

After executing block 1220, the method 1200 proceeds back to block 1210 where the electronic processor 420 continues to monitor the current drawn by the brushless DC motor 34 and determine whether to implement speed clipping based on the decisions made at block 1215. For example, if the load/output torque of the brushless DC motor 34 decreases below the predetermined load/output torque as determined by the electronic processor 420 at block 1215, the method 1200 proceeds back to block 1205 where the electronic processor 420 re-implements speed clipping.

As indicated by FIGS. 26 and 27, the electronic processor 420 is configured to control the switching elements 425 differently in different operating ranges of the brushless DC motor 34. In particular, in a first operating range when a load experienced by the brushless DC motor 34 is less than or equal to the predetermined load 1120 (i.e., a speed clipping range 1110 shown in FIG. 26), the electronic processor 420 is configured to control the power switching elements 425 to drive the brushless DC motor 34 at an approximately constant speed regardless of the load experienced by the brushless DC motor 34. In a second operating range when the load experienced by the brushless DC motor 34 is greater than the predetermined load 1120 (i.e., a non-speed clipping range within the typical operating range 1010 shown in FIG. 26), the electronic processor 420 is configured to control the power switching elements 425 to drive the brushless DC motor 34 at a decreasing speed as the load experienced by the brushless DC motor 34 increases.

In some embodiments, the approximately constant speed at which the electronic processor 420 controls the motor 34 to operate within the speed clipping range 1110 is user selectable via at least one of a first user interface located on the housing 304 or the frame 302 of the drain cleaning machine 10 (e.g., a control panel as described previously herein) and a second user interface provided on the external device 605 that is configured to wirelessly communicate with the wireless transceiver 515 of the drain cleaning machine 10 (see FIG. 28).

In addition to the speed of the motor 34 being user selectable, in some embodiments, the electronic processor 420 is additionally or alternatively configured to control the power switching elements 425 to drive the brushless DC motor 34 to provide an output torque that is user selectable. Like a user-selectable speed of the motor 34, the output torque may be user selectable via at least one of a first user interface located on the housing 304 or the frame 302 of the drain cleaning machine 10 (e.g., a control panel as described previously herein) and a second user interface provided on the external device 605 that is configured to wirelessly communicate with the wireless transceiver 515 of the drain cleaning machine 10 (see FIG. 28). For the sake of brevity, the below explanation describes the second user interface of the external device 605, but, in some embodiments, the below functionality and control may additionally or alternatively be implemented on the first interface of the drain cleaning machine 10 (e.g., the control panel described previously herein).

FIG. 28 illustrates an example user interface 1305 that may be displayed on the touch display 720 of the external device 605 according to one embodiment. In other embodiments, the user interface 1305 may alternatively or also be displayed on a touch display that is mounted on or integrated into the drain cleaning machine 10. The user interface 1305 may include a user selectable speed setting 1310 and a user selectable torque/current maximum setting 1315. The speed setting 1310 may include an on/off toggle 1320 to allow the user to decide whether to manually select the speed setting 1310 (by selecting "on") or whether the drain cleaning machine 10 will operate at a default speed (by selecting "off"). To manually select the speed setting 1310, the user may adjust a slider 1325 within a range of motor speeds as shown in FIG. 28. The range of motor speeds is merely an example and may be different in other embodiments. In some embodiments, the user may select the motor speed in other manners such as by entering a value into a textbox. The speed setting 1310 allows the user to set a speed at which the motor 34 is configured to operate during the speed clipping range of 1110 of FIG. 26. The torque/current maximum setting 1315 allows the user to set a maximum current that will be provided to the motor 34 during operation. Similar to the speed setting 1310, the torque/current maximum setting 1315 includes an on/off toggle 1330 and a slider 1335.

After the user selects the settings 1310 and 1315 as desired, a "transmit settings" button 1340 may be pressed by the user to transmit the user selected settings to the drain cleaning machine 10 for use by the electronic processor 420. As shown in FIG. 28, the user interface 1305 also includes an "unpair" button 1345 to allow the external device 605 to communicatively unpair with the drain cleaning machine 10 to allow the external device 605 to communicatively pair with other drain cleaning machines or electronic devices.

As described previously herein, allowing the user to select different speeds and maximum torques/currents of the drain cleaning machine 10 may be useful when the drain cleaning machine 10 is used in different applications (e.g., different clogs, clogs of different size pipes, different distances in which the snake is to be inserted into a pipe, different types of cable being used as the snake, different accessories attached to the snake, etc.). For example, if the user is using the drain cleaning machine 10 to attempt to unclog a relatively large diameter pipe with a small cable (i.e., snake), the cable may become tangled (i.e., rats nest) easily. Thus, the user may desire to limit the speed or limit the maximum torque/current of the motor 34 that radially rotates/spins the cable. On the other hand, if the user is using the drain cleaning machine 10 to attempt to unclog a relatively small diameter pipe with the small cable, the cable may not become as tangled as easily. Thus, the user may desire for the drain cleaning machine 10 to provide maximum possible torque/current to radially rotate/spin the cable break through the clog. As another example, if the user plans to extend the cable a relatively long distance (e.g., twenty feet) into a pipe, the user may desire a lower maximum torque/current setting than when the cable is only planned to be extended a shorter distance (e.g., two feet) into the pipe.

In some embodiments, the user may not be aware of appropriate settings for speed and maximum torque/current based on a given application. Thus, in some embodiments, the external device 605 provides a user interface 1405 in FIG. 29 that aids the user in selecting a recommended speed and maximum torque/current based on different characteristics of the application in which the drain cleaning machine 10 will be used. For example, the user interface 1405 includes parameter assist blocks 1410, 1415, 1420, and 1425 where the user may respectively enter different characteristics of the application in which the drain cleaning machine 10 will be used by selecting the arrow to the right of each parameter assist block. In some embodiments, the pipe size parameter assist block 1410 allows the user to enter a diameter of the pipe into which the cable will be inserted. In some embodiments, the insertion distance parameter assist block 1415 allows the user to enter a distance that the cable is expected to be inserted into the pipe. In some embodiments, the cable type parameter assist block 1420 allows the user to enter at least one of a type of material of the cable that is being used as the snake and a thickness/diameter of the cable. In some embodiments, the cable accessory parameter assist block 1425 allows the user to select a type of accessory that is attached to a head or other portion of the cable (e.g., cutters, knockers, opening tools, straight augers, chain knockers, a flue brush, and retrieving tools).

Once the characteristics of a particular application are entered, the user may press the button 1430 and, in response thereto, the electronic processor 705 of the external device 605 may generate recommended speed and torque/current settings based on the entered characteristics. In some embodiments, the electronic processor 705 may access a locally-stored or remotely-stored look-up table that provides recommended settings based on the entered characteristics. In some embodiments, the electronic processor 705 controls the touch display 720 to re-display the user interface 1305 with the recommended values of the settings 1310 and 1315 shown on the user interface 1305 along with an indication that the values are the recommended settings. In some embodiments, the user is able to make adjustments to the recommended settings, if desired, by interacting with the sliders 1325 and 1335 as explained previously herein. In some embodiments, the recommended settings are determined so as to reduce the likelihood of the cable/snake tangling (i.e., rats nesting) as explained previously herein. In some embodiments, the recommended settings are determined so as to provide higher maximum torque/current in situations where tangling of the cable is less likely than in situations where tangling of the cable is more likely as explained previously herein.

In some embodiments, the electronic processor 705 does not require that characteristics be entered in every parameter assist block 1410, 1415, 1420, and 1425 shown in FIG. 29 and may provide recommended settings based on characteristics entered in one or more of the parameter assist blocks 1410, 1415, 1420, and 1425. In some embodiments, the user interface 1405 may include fewer or additional parameter assist blocks based on which the electronic processor 705 determines the recommended settings. In some embodiments, the user interface 1305 may allow the user to control additional settings of the drain cleaning machine 10 such as turning an integrated work light on or off.

Although the invention has been described in detail with reference to certain preferred embodiments, variations and modifications exist within the scope and spirit of one or more independent aspects of the invention as described.

We claim:

1. A drain cleaning machine for moving a snake in a drain, the drain cleaning machine comprising:
   a snake passage defining a snake axis;
   a brushless direct current (DC) motor configured to rotate a snake about the snake axis;
   a load sensor configured to send a signal indicative of a load experienced by the brushless DC motor;
   power switching elements configured to control an amount of current provided to the brushless DC motor; and
   an electronic processor coupled to the power switching elements and to the load sensor, and configured to
      determine motor positional information of the brushless DC motor and control the power switching elements to drive the brushless DC motor based at least partially on the motor positional information,
      determine the load experienced by the brushless DC motor based on the signal from the load sensor,
      determine that the brushless DC motor is operating in a first operating range in response to determining that the load experienced by the brushless DC motor is less than or equal to a predetermined load,
      in response to determining that the brushless DC motor is operating in the first operating range, control the power switching elements to drive the brushless DC motor at an approximately constant speed regardless of the load experienced by the brushless DC motor,
      determine that the brushless DC motor is operating in a second operating range in response to determining that the load experienced by the brushless DC motor is greater than the predetermined load, and
      in response to determining that the brushless DC motor is operating in the second operating range, control the power switching elements to drive the brushless DC motor at a decreasing speed as the load experienced by the brushless DC motor increases.

2. The drain cleaning machine of claim 1, wherein the electronic processor is configured to control the power switching elements to cause a rotational speed under a variable load of the brushless DC motor to behave approximately the same as that of an alternating current (AC)

induction motor of approximately the same size as the brushless DC motor by implementing speed clipping in the first operating range.

3. The drain cleaning machine of claim 1, wherein the approximately constant speed is user selectable via a first user interface located on the drain cleaning machine, a second user interface provided on an external device configured to communicate with the drain cleaning machine, or both.

4. The drain cleaning machine of claim 1, wherein the electronic processor is configured to control the power switching elements to drive the brushless DC motor by providing pulse width modulation (PWM) signals to the power switching elements.

5. The drain cleaning machine of claim 1, wherein the load sensor comprises a current sensor coupled to the electronic processor, wherein the electronic processor is configured to determine the load experienced by the brushless DC motor by receiving the signal from the current sensor, the signal being indicative of a current drawn by the brushless DC motor.

6. The drain cleaning machine of claim 1, further comprising a motor position sensor coupled to the electronic processor, wherein the electronic processor is configured to determine the motor positional information based on a second signal received from the motor position sensor.

7. A method for controlling a drain cleaning machine to move a snake in a drain, the method comprising:
  determining, with an electronic processor of the drain cleaning machine, motor positional information of a brushless DC motor of the drain cleaning machine, the brushless DC motor being configured to rotate a snake about a snake axis defined by a snake passage;
  controlling, with the electronic processor, power switching elements to drive the brushless DC motor based at least partially on the motor positional information, the power switching elements being configured to control an amount of current provided to the brushless DC motor;
  determining, with the electronic processor, a load experienced by the brushless DC motor based on a signal from a load sensor;
  determining, with the electronic processor, that the brushless DC motor is operating in a first operating range in response to determining that the load experienced by the brushless DC motor is less than or equal to a predetermined load;
  in response to determining that the brushless DC motor is operating in the first operating range, controlling, with the electronic processor, the power switching elements to drive the brushless DC motor at an approximately constant speed regardless of the load experienced by the brushless DC motor;
  determining, with the electronic processor, that the brushless DC motor is operating in a second operating range in response to determining that the load experienced by the brushless DC motor is greater than the predetermined load; and
  in response to determining that the brushless DC motor is operating in the second operating range, controlling, with the electronic processor, the power switching elements to drive the brushless DC motor at a decreasing speed as the load experienced by the brushless DC motor increases.

8. The method of claim 7, further comprising controlling, with the electronic processor, the power switching elements to cause a rotational speed under a variable load of the brushless DC motor to behave approximately the same as that of an alternating current (AC) induction motor of approximately the same size as the brushless DC motor by implementing speed clipping in the first operating range.

9. The method of claim 7, further comprising receiving a user-selected value of the approximately constant speed via a first user interface located on the drain cleaning machine, a second user interface provided on an external device configured to communicate with the drain cleaning machine, or both.

10. The method of claim 7, wherein controlling the power switching elements to drive the brushless DC motor includes providing, with the electronic processor, pulse width modulation (PWM) signals to the power switching elements.

11. The method of claim 7, wherein determining the load experienced by the brushless DC motor based on the signal from the load sensor includes:
  receiving, with the electronic processor, the signal from a current sensor, the signal being indicative of a current drawn by the brushless DC motor; and
  determining, with the electronic processor, the load experienced by the brushless DC motor based on the signal from the current sensor.

12. The method of claim 7, further comprising receiving, with the electronic processor, a second signal from a motor position sensor;
  wherein determining the motor positional information of the brushless DC motor includes determining, with the electronic processor, the motor positional information of the brushless DC motor based on the second signal received from the motor position sensor.

13. A drain cleaning machine for moving a snake in a drain, the drain cleaning machine comprising:
  a snake passage defining a snake axis;
  a brushless direct current (DC) motor configured to rotate a snake about the snake axis;
  a current sensor configured to send a signal indicative of a current drawn by the brushless DC motor;
  power switching elements configured to control an amount of current provided to the brushless DC motor; and
  an electronic processor coupled to the power switching elements and to the current sensor, and configured to
    determine motor positional information of the brushless DC motor and control the power switching elements to drive the brushless DC motor based at least partially on the motor positional information,
    determine a load experienced by the brushless DC motor based on the signal from the current sensor;
    determine that the brushless DC motor is operating in a first operating range in response to determining that the load experienced by the brushless DC motor is less than or equal to a predetermined load,
    in response to determining that the brushless DC motor is operating in the first operating range, control the power switching elements to drive the brushless DC motor at an approximately constant speed regardless of the load experienced by the brushless DC motor:
    determine that the brushless DC motor is operating in a second operating range in response to determining that the load experienced by the brushless DC motor is greater than the predetermined load, and
    in response to determining that the brushless DC motor is operating in the second operating range, control the power switching elements to drive the brushless DC motor at a decreasing speed as the load experienced by the brushless DC motor increases;

wherein the electronic processor is configured to control the power switching elements to drive the brushless DC motor to operate at one or more user selectable parameters.

14. The drain cleaning machine of claim 13, wherein the one or more user selectable parameters includes a speed that is user selectable, an output torque that is user selectable, or both.

15. The drain cleaning machine of claim 14, wherein at least one of the speed and the output torque is user selectable via a first user interface located on the drain cleaning machine, a second user interface provided on an external device configured to communicate with the drain cleaning machine, or both.

16. The drain cleaning machine of claim 15, wherein at least one of the first user interface and the second user interface is configured to receive information regarding at least one of a type of cable being used as the snake, a type of accessory attached to the snake, a diameter of a pipe into which the snake is to be inserted, and a distance that the snake is expected to be inserted into the pipe; and
wherein at least one of the electronic processor of the drain cleaning machine and a second electronic processor of the external device is configured to determine the speed, a maximum output torque, or both of the brushless DC motor based on the at least one of the type of cable, the type of accessory, the diameter of the pipe, and the distance that the snake is expected to be inserted into the pipe.

17. The drain cleaning machine of claim 13, further comprising an output device coupled to the electronic processor, wherein the electronic processor is configured to:
monitor the output torque of the brushless DC motor;
determine that the output torque is greater than a predetermined threshold; and
in response to determining that the output torque is greater than the predetermined threshold, control the output device to provide an indication that the output torque is greater than the predetermined threshold.

18. The drain cleaning machine of claim 13, wherein the electronic processor is configured to:
monitor the current provided to the brushless DC motor and an amount of time during which the current is provided to the brushless DC motor;
determine that the brushless DC motor is at risk of overheating based on the current and the amount of time during which the current is provided to the brushless DC motor; and
in response to determining that the brushless DC motor is at risk of overheating, control the power switching elements to cease driving the brushless DC motor.

19. The drain cleaning machine of claim 13, wherein the electronic processor is configured to control the power switching elements to drive the brushless DC motor by providing pulse width modulation (PWM) signals to the power switching elements.

20. The drain cleaning machine of claim 13, further comprising a motor position sensor coupled to the electronic processor, wherein the electronic processor is configured to determine the motor positional information based on a second signal received from the motor position sensor.

* * * * *